3,536,712
1-(AMINO-DIHALO-PHENYL)-2-AMINO-ETHANES AND -ETHANOLS AND SALTS THEREOF
Johannes Keck, Gerd Krüger, and Hans Machleidt, Biberach (Riss), Klaus Noll, Warthausen-Oberhofen, and Günther Engelhardt and Albrecht Eckenfels, Biberach (Riss), Germany, assignors to Boehringer Ingelheim G.m.b.H., Ingelheim am Rhein, Germany
No Drawing. Filed Sept. 19, 1967, Ser. No. 668,953
Claims priority, application Germany, Sept. 22, 1966, T 32,111; Feb. 15, 1967, T 33,217; June 2, 1967, T 34,019
Int. Cl. C07c 87/28, 91/22
U.S. Cl. 260—253
14 Claims

ABSTRACT OF THE DISCLOSURE

The compounds are substitution products of 1-(amino-dihalo-phenyl)-2-amino-ethanes and acid addition salts thereof, useful for enhancing the blood circulation, and as bronchodilators, analgesics, sedatives, antipyretics, antiphlogistics and antitussives in warm-blooded animals.

---

This invention relates to novel 1-(amino-dihalo-phenyl)-2-amino-ethane derivatives and acid addition salts thereof, as well as to various methods of preparing these compounds.

More particularly, the present invention relates to compounds of the formula

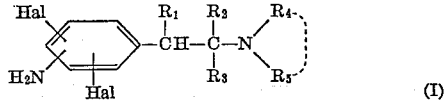

(I)

wherein each Hal is chlorine or bromine;

$R_1$ is hydrogen or hydroxyl;

$R_2$ and $R_3$ are each hydrogen or alkyl of 1 to 4 carbon atoms; and $R_4$ and $R_5$ are each hydrogen, lower alkyl, lower alkenyl, lower alkinyl, hydroxy-lower alkyl, lower alkoxy-lower alkyl, di-lower alkyl-amino-lower alkyl, cycloalkyl, phenyl, benzyl or adamantyl; or, together with each other and the nitrogen atom to which they are attached, pyrolidino, lower alkyl-pyrrolidino, piperidino, lower alkyl-piperidino, piperazino, N'-lower alkyl-piperazino, morpholino, lower alkyl-morpholino, hexamethyleneimino, lower alkyl-hexamethyleneimino, camphidino or lower alkyl-camphidino;

and non-toxic, pharmacologically acceptable acid addition salts thereof.

The compounds according to the present invention may be prepared by a number of different methods involving well known chemical principles, among which the following have proved to be particularly convenient and efficient.

Method A

By brominating or chlorinating the phenyl ring of an amino-phenethyl-amine of the formula

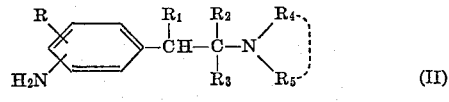

(II)

wherein

R is hydrogen, bromine or chlorine, and $R_1$ through $R_5$ have the same meanings as in Formula I except lower alkenyl or lower alkinyl, or an acid addition salt thereof, with a brominating or chlorinating agent, such as bromine or chlorine.

The halogenation reaction is preferably carried out in 50 to 100% acetic acid and advantageously at a temperature between 0 and 50° C., using one or two mols or a slight excess thereover of the halogenating agent per mol of starting compound II or an acid addition salt thereof, such as the mono- or dihydrochloride. The hydrogen halide addition salt of the halogenated product may be isolated as such from the reaction mixture, or it may be converted into the free base by conventional methods, which in turn may be converted into any other desired acid addition salt. Depending upon the position of the amino-substituent on the phenyl ring, the halogen substituents are introduced into the 3,5- or 4,6-positions on the phenyl ring.

Method B

For the preparation of a compound of the Formula I wherein $R_1$ is hydroxyl, by reducing an aminoketone of the formula

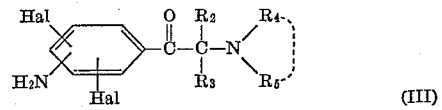

(III)

wherein Hal and $R_2$ through $R_5$ have the same meanings as in Formula I, with a complex metal hydride, preferably an alkali metal borohydride, in the presence of an inert organic solvent, such as a lower alkanol or an ether, and at a temperature between —25 and +50° C.

Method C

For the preparation of a compound of the Formula I wherein $R_1$ is hydrogen, by reducing an aminoketone of the Formula III above with hydrazine. The reduction reaction is carried out by the Wolff-Kishner method as modified by Huang-Minlon; it is advantageously performed in the presence of a high-boiling-point alcohol, such as di- or triethyleneglycol, and the intermediate hydrazone compound is subsequently decomposed with a strong base, such as caustic soda or caustic potash [see also J.A.C.S. 68, 2487 (1946)].

Method D

By reacting a compound of the formula

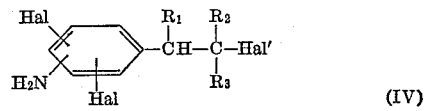

(IV)

wherein $R_1$ through $R_3$ and Hal have the same meanings as in Formula I and Hal' is chlorine, bromine or iodine, with an amine of the formula

(V)

wherein $R_4$ and $R_5$ have the same meanings as in Formula I. The reaction is preferably carried out in the presence of an organic solvent and of a compound capable of neutralizing or tying up the hydrogen halide released by the reaction, and at a temperature up to and including the boiling point of the particular organic solvent which is employed. Examples of suitable organic solvents are alkanols, such as ethanol, and halogenated hydrocarbons, such as carbon tetrachloride. Examples of suitable hydrogen halide-binding compounds are secondary or tertiary organic bases, including an amine of the Formula V. In the event that an excess of an amine of the Formula V or a tertiary organic base is used as the hydrogen halide-binding compound, the same may at the same time serve as the solvent medium for the reaction.

Method E

By reducing a compound of the formula

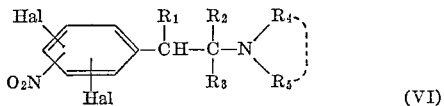

wherein Hal and $R_1$ through $R_5$ have the same meanings as in Formula I, with nascent hydrogen, catalytically activated hydrogen or a mixture of stannous chloride and hydrochloric acid. Particularly good results are obtained by effecting the reduction with hydrogen in the presence of Raney nickel as a catalyst, and advantageously in the presence of a lower alkanol, such as methanol or ethanol, as a solvent medium.

Method F

By de-acylating a compound of the formula

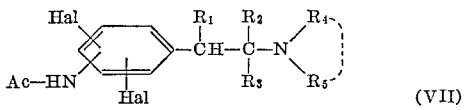

wherein $R_1$ through $R_5$ and Hal have the same meanings as in Formula I and Ac is any desired acyl radical, pursuant to customary methods, such as boiling with a dilute mineral acid.

Method G

For the preparation of a compound of the Formula I wherein $R_1$ is hydroxyl, $R_2$ and $R_3$ are hydrogen, and the amino substituent is in the 2-position of the phenyl ring, by reducing a compound of the formula

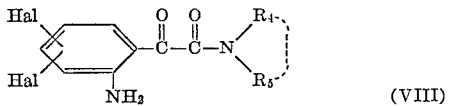

wherein Hal, $R_4$ and $R_5$ have the same meanings as in Formula I, with a complex alkali metal hydride, such as lithium aluminum hydride, in the presence of an inert anhydrous organic solvent, such as anhydrous diethyl-ether.

Method H

For the preparation of a compound of the Formula I wherein $R_1$ is hydroxyl, $R_2$ and $R_3$ are hydrogen, and the amino substituent is in the 2-position of the phenyl ring, by reducing a compound of the formula

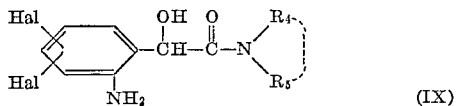

wherein Hal, $R_4$ and $R_5$ have the same meanings as in Formula I, with a complex alkali metal hydride, such as lithium aluminum hydride, in the presence of an inert anhydrous organic solvent, such as anhydrous diethyl-ether.

The starting compounds required for Methods A through H are either described in the literature or may be prepared by methods described in the literature.

Thus, for example, a compound of the Formula II may be obtained by nitrating a corresponding phenethylamine and reducing the intermediate nitrophenethylamine. The same compound may also be obtained by reducing a correspondingly substituted aminoacetophenone derivative pursuant to customary methods. For instance, using either of these methods, the following starting compounds of the Formula II were synthesized:

1-(4'-amino-phenyl) - 2 - cyclohexylamino-ethanol-(1) hydrochloride, M.P. 162–163° C. (decomp.)

1-(4'-amino-phenyl) - 2 - hexamethyleneimino-ethanol-(1) hydrochloride, M.P. 160–161° C. (decomp.)

1-(4'-amino-phenyl) - 2 - (2''-methyl-piperidino)-ethanol-(1) hydrochloride, M.P. 183–194° C. (decomp.)

1-(4'-amino-phenyl) - 2 - (β-diethylamino-ethylamino)-ethanol-(1) dihydrochloride, M.P. 140–145° C. (decomp.)

2-ethylamino - 1 - (2'-amino-phenyl)ethanol-(1) dihydrochloride, M.P. 170–171° C. (decomp.)

1-(2'-amino-phenyl) - 2 - diethylamino-ethanol-(1) dihydrochloride, M.P. 152–154° C. (decomp.)

1-(3'-amino-phenyl) - 2 - diethylamino-ethanol-(1) dihydrochloride, M.P. 200–202° C.

2-(N-ethyl-benzylamino) - 1 - (2'-amino-phenyl)-ethanol-(1) hydrochloride, M.P. 150–151° C. (decomp.)

A compound of the Formula III may be obtained by halogenating a correspondingly substituted halogen-free aminoketone. Using this method, the following starting compounds of the Formula III were prepared:

2'-amino - 2 - diethylamino-3',5'-dibromo-acetophenone hydrochloride, M.P. 166–168° C. (decomp.)

4'-amino-3',5'-dibromo - 2 - dimethylamino-acetophenone hydrochloride, M.P. 275–276° C. (decomp.)

A compound of the Formula IV may, for example, be obtained by halogenating a corresponding aminophenethylhalide; and a compound of the Formula IV wherein $R_1$ is hydroxyl may also be obtained by reducing a corresponding amino-dihalo-phenacyl-halide with sodium borohydride.

A compound of the Formula VI may, for example, be obtained by reducing a corresponding ketone with sodium borohydride, or by nitrating a corresponding dihalophenethylamine. Using either of these methods, the following starting compounds of the Formula VI were synthesized:

1-(3',5'-dibromo - 4' - nitro-phenyl) - 2 - diethylamino-ethanol-(1); M.P. of hydrochloride: 208–210° C. (decomp.)

1-(2',5'-dichloro - 4' - nitro-phenyl) - 2 - diethylamino-ethanol-(1); M.P. of hydrochloride: 183–185° C. (decomp.)

A compound of the Formula VII may, for example, be obtained by reducing a corresponding ketone with a complex alkali metal hydride, such as sodium borohydride. Using this method, the following starting compounds of the Formula VII were synthesized:

1-(2'-acetylamino - 3',5' - dibromo-phenyl) - 2 - diethylaminoethanol-(1), M.P. 150–151° C.

1-(3'-acetylamino - 4',6' - dibromo-phenyl) - 2 - diethylaminoethanol-(1), M.P. of hydrochloride: 187–188° C.

1-(4'-acetylamino - 3',5' - dibromo-phenyl) - 2 - diethylaminoethanol-(1), M.P. of hydrochloride: 232–234° C. (decomp.)

1-(4'-acetylamino - 3',5' - dichloro-phenyl) - 2 - diethylaminoethanol-(1), M.P. of hydrochloride: 209–210° C. (decomp.)

2-diethylamino - 1 - (3',5'-dibromo - 4' - propionylaminophenyl)-ethanol-(1), M.P. of hydrochloride: 223–225° C. (decomp.)

1-(4'-benzoylamino - 3',5' - dibromo-phenyl)-2-diethylaminoethanol-(1), M.P. of hydrochloride: 236–238° C.

1-[4'-(p-chlorobenzoylamino) - 3',5' - dibromo-phenyl]-2 - diethylamino-ethanol-(1), M.P. of hydrochloride: 173–175° C. (decomp.)

A compound of the Formula VIII may, for example, be obtained by reacting a dihalogenated isatin derivative with a substituted amine. In this manner the following starting compound of the Formula VIII was synthesized:

(2-amino-3,5-dibromo-phenyl)-glyoxalic acid diethylamide, M.P. 109–110° C.

Finally, a compound of the Formula IX may, for example, be obtained by reducing the corresponding phenyl-glyoxalic acid compound with sodium borohydride. In this fashion the following starting compound of the Formula IX was synthesized:

(2-amino-3,5-dibromo-phenyl)-glycolic acid diethylamide, M.P. 112–113° C.

The compounds of the Formula I are organic bases and, therefore, form acid addition salts with one, two or three equivalents of an inorganic or organic acid, depending upon whether the molecule of the free base contains one, two or three basic groupings in the molecule. Such acid addition salts may be obtained by customary methods, such as by reacting the free base with an ethanolic solution of the desired acid. Examples of non-toxic, pharmacologically acceptable acid addition salts are those formed with hydrochloric acid, hydrobromic acid, sulfuric acid, phosphoric acid, lactic acid, citric acid, tartaric acid, maleic acid, fumaric acid, 8-chlorotheophylline or the like.

The following examples further illustrate the present invention and will enable others skilled in the art to understand it more completely. It should be understood, however, that the instant invention is not limited solely to the particular examples given below.

EXAMPLE 1

Preparation of 1-(4'-amino-3',5'-dibromo-phenyl) - 2 - diethylamino-ethanol-(1) and its hydrochloride by Method A 127 gm. of 1-(4'-amino-phenyl)-2-diethylamino-ethanol-(1) hydrochloride were dissolved in a mixture of 250 cc. of glacial acetic acid and 50 cc. of water, and 165.5 gm. of bromine were added dropwise while stirring the solution and maintaining the temperature of the reaction mixture below 30° C. by cooling with ice water. After all of the bromine had been added, the reaction mixture was stirred for thirty minutes more, then diluted with 200 cc. of water, and made alkaline with concentrated ammonia while cooling with ice, taking care that the temperature of the reaction mixture did not rise above 40° C. The alkaline mixture was extracted three times with 200 cc.—portions of chloroform, and the chloroform extract solutions were combined, dried with sodium sulfate and evaporated. The residue, the free base 1-(4'-amino-3',5'-dibromo-phenyl)-2-diethylamino-ethanol-(1), was dissolved in absolute ethanol, gaseous hydrogen chloride was passed through the solution, and the precipitate formed thereby was collected. It had a melting point of 198–199° C. (decomp.) and was identified to be 1-(4'-amino-3',5'-dibromo-phenyl)-2-diethylamino-ethanol - (1) hydrochloride of the formula

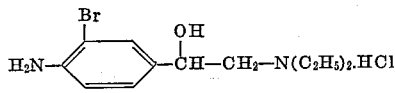

EXAMPLE 2

Preparation of 1-(4'-amino-3',5'-dichloro-phenyl) - 2 - diethylamino-ethanol and its hydrochloride by Method A 40 gm. of 1 - (4'-amino-phenyl)-2-diethylamino-ethanol-(1) hydrochloride were dissolved in 250 cc. of glacial acetic acid, and 24 gm. of chlorine gas were passed into the solution over a period of forty minutes while cooling with ice and intensively stirring the solution. Thereafter, the dark-colored solution was made alkaline with concentrated ammonia while cooling with ice, and the alkaline mixture was extracted four times with 200 cc.—portions of chloroform. The chloroform extract solutions were combined, dried with sodium sulfate and evaporated. The residue was purified by passing it through a chromatographic column packed with silica gel, using ethylacetate and acetone as elution agents. The acetone fraction was evaporated, and the residue, the free base 1-(4'-amino-3',5'-dichloro-phenyl)-2-diethylamino - ethanol-(1), was dissolved in a small amount of absolute ethanolic hydrochloric acid. Ether was added to the resulting solution, whereby a precipitate formed which was collected and recrystallized from absolute ethanol/ether. It had a melting point of 152–154° C. (decomp.) and was identified to be 1-(4'-amino-3',5'-dichloro-phenyl)-2-diethylamino-ethanol-(1) hydrochloride of the formula

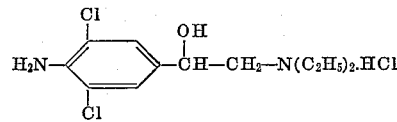

EXAMPLE 3

Preparation of 1-(2'-amino-3',5'-dibromo-phenyl) - 2 - diethylamino-ethanol-(1) and its hydrochloride by Method B 6.1 gm. of 2-diethylamino-2'-amino-3',5'-dibromo-acetophenone [prepared from its monohydrochloride, M.P. 166–168° C. (decomp.)] were dissolved in 150 cc. of methanol, and the resulting solution was cooled to −25° C. and then admixed with 0.65 gm. of sodium borohydride. The resulting mixture was stirred for one hour at −10 to −15° C. and was then allowed to warm to room temperature. Thereafter, it was allowed to stand for two hours at room temperature, its pH was then adjusted to 6 with 2 N hydrochloric acid, and it was evaporated in vacuo to dryness. The residue was dissolved in 100 cc. of water, the solution was made distinctly acid with dilute hydrochloric acid, and the acid solution was extracted three times with ether to remove colored impurities. The pH of the aqueous phase was adjusted to 10, and the reaction product, the free base 1-(2'-amino-3',5'-dibromo-phenyl)-2-diethylamino-ethanol-(1), was extracted with ether. The ether extract solution was dried, acidified with isopropanolic hydrochloric acid, and the precipitate formed thereby was collected and recrystallized from isopropanol, yielding 1-(2'-amino-3',5'-dibromo-phenyl)-2-diethylamino-ethanol-(1) hydrochloride, M.P. 177–178° C., of the formula

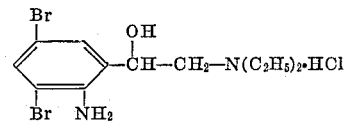

EXAMPLE 4

Using a procedure analogous to that described in Example 1, 1-(4'-amino-3',5'-dibromo-phenyl)-2-aminoethane and its hydrochloride, M.P. 278–280° C. (decomp.) of the formula

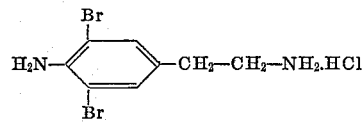

were prepared from 1-(4'-amino-phenyl)-2-amino-ethane hydrochloride and bromine.

EXAMPLE 5

Using a procedure analogous to that described in Example 1, 1 - (4'-amino-3',5'-dibromo-phenyl)-2-aminoethanol-(1) and its hydrochloride, M.P. 214–216° C. (decomp.) of the formula

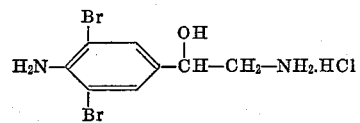

were prepared from 1-(4'-amino-phenyl)-2-aminoethanol-(1) hydrochloride and bromine.

EXAMPLE 6

Using a procedure analogous to that described in Example 1, 1 - (4'-amino-3',5'-dibromo-phenyl)-2-aminopropane and its hydrochloride, M.P. 264–266° C. (decomp.), of the formula

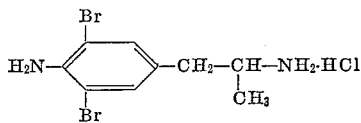

were prepared from 1-(4'-amino-phenyl)-2-amino-propane hydrochloride and bromine.

EXAMPLE 7

Using a procedure analogous to that described in Example 1, 1-(4'-amino-3',5'-dibromo-phenyl)-2-amino-2-methyl-propane and its hydrochloride, M.P. 253–254° C. (decomp.) of the formula

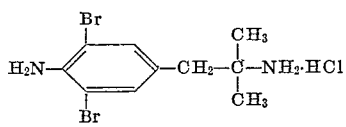

were prepared from 1-(4'-amino-phenyl)-2-amino-2-methyl-propane hydrochloride and bromine.

EXAMPLE 8

Using a procedure analogous to that described in Example 1, 1-(4'-amino-3',5'-dibromo-phenyl)-2-aminopropanol-(1) and its hydrochloride, M.P. 174–175° C. (decomp.), of the formula

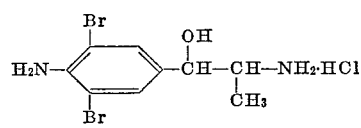

were prepared from 1-(4'-amino-phenyl)-2-amino-propanol-(1) hydrochloride and bromine.

EXAMPLE 9

Using a procedure analogous to that described in Example 1, 1-(4'-amino-3',5'-dibromo-phenyl)-2-(methyl-amino)-ethane and its hydrochloride, M.P. 221–222° C., of the formula

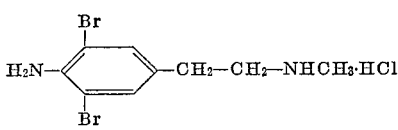

were prepared from 1-(4'-amino-phenyl)-2-(methyl-amino)-ethane hydrochloride and bromine.

EXAMPLE 10

Using a procedure analogous to that described in Example 1, 1-(4'-amino-3',5'-dibromo-phenyl)-2-(methyl-amino)-ethanol-(1) and its hydrochloride, M.P. 210–216° C. (decomp.), of the formula

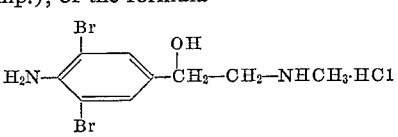

were prepared from 1-(4'-amino-phenyl)-2-(methyl-amino)-ethanol-(1) hydrochloride and bromine.

EXAMPLE 11

Using a procedure analogous to that described in Example 1, 1-(4'-amino-3',5'-dibromo-phenyl)-2-(methyl-amino)-propanol-(1) and its dihydrochloride, M.P. 153–154° C. (decomp.), of the formula

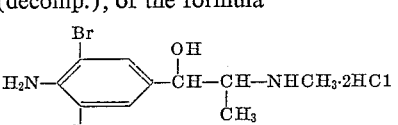

were prepared from 1-(4'-amino-phenyl)-2-(methyl-amino)-propanol-(1) hydrochloride and bromine.

EXAMPLE 12

Using a procedure analogous to that described in Example 1, 1-(4'-amino-3',5'-dibromo-phenyl)-2-(dimethyl-amino)-ethane and its hydrochloride, M.P. 219–221° C. (decomp.), of the formula

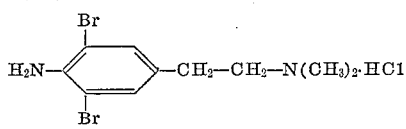

were prepared from 1-(4'-amino-phenyl)-2-(dimethyl-amino)-ethane hydrochloride and bromine.

EXAMPLE 13

Using a procedure analogous to that described in Example 1, 1-(2'-amino-3',5'-dibromo-phenyl)-2-(dimethyl-amino)-ethanol-(1) and its hydrochloride, M.P. 189–190° C. (decomp.), were prepared from 1-(2'-amino-phenyl)-2-(dimethyl-amino)-ethanol-(1) dihydrochloride and bromine.

EXAMPLE 14

Using a procedure analogous to that described in Example 3, 1-(4'-amino-3',5'-dibromo-phenyl)-2-(dimethyl-amino)-ethanol-(1) and its dihydrochloride, M.P. 130.5–131° C. (decomp.), were prepared from 4'-amino-3',5'-dibromo-2-(dimethyl-amino) - acetophenone hydrochloride.

EXAMPLE 15

Using a procedure analogous to that described in Example 1, 1-(2'-amino - 3',5' - dibromo - phenyl)-2-(ethyl-amino)-ethanol-(1) and its hydrobromide, M.P. 184–185° C. (decomp.), of the formula

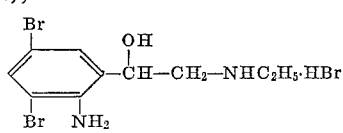

were prepared from 1 - (2' - amino - phenyl)-2-(ethyl-amino)-ethanol-(1) dihydrochloride and bromine.

EXAMPLE 16

Using a procedure analogous to that described in Example 1, 1-(4' - amino - 3',5' - dimbromo - phenyl)-2-(ethyl - amino) - ethanol - (1) and its hydrochloride, M.P. 174–175° C. (decomp.), of the formula

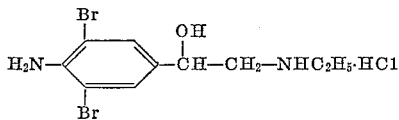

were prepared from 1-(4'-amino-phenyl)-2-(ethyl-amino)-ethanol-(1) hydrochloride and bromine.

EXAMPLE 17

Using a procedure analogous to that described in Example 1, 1-(4' - amino - 3',5' - dibromo - phenyl)-2-(N-methyl-ethylamino)-ethanol-(1) and its dihydrochloride, M.P. 118–121° C. (decomp.), of the formula

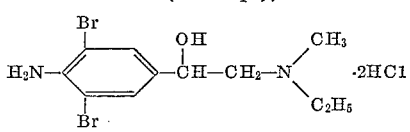

were prepared from 1-(4' - amino - phenyl)-2-(N-methyl-ethylamino)-ethanol-(1) dihydrochloride and bromine.

EXAMPLE 18

Using a procedure analogous to that described in Example 1, 1-(4' - amino - 3',5' - dibromo - phenyl)-2-

(diethylamino)-ethane and its hydrochloride, M.P. 205–207° C., of the formula

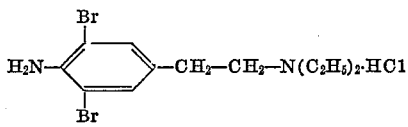

were prepared from 1(4'-amino - phenyl) - 2 - (diethyl-amino)-ethane dihydrochloride and bromine.

EXAMPLE 19

Using a procedure analogous to that described in Example 1, 1-(2' - amino - 3',5' - dibromo - phenyl)-2-(diethyl-amino)-ethanol-(1) and its hydrochloride, M.P. 177–178° C., were prepared from 1-(2'-amino-phenyl)-2-(diethyl-amino)-ethanol-(1) dihydrochloride and bromine. The product was identical to the end product of Example 3.

EXAMPLE 20

Using a procedure analogous to that described in Example 1, 1-(3' - amino - 4',6' - dibromo - phenyl)-2-diethyl-amino)-ethanol-(1) and its hydrochloride, M.P. 190–194° C. (decomp.), of the formula

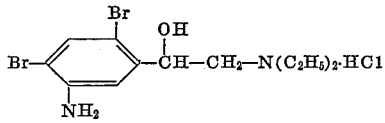

were prepared from 1-(3' - amino - phenyl)-2-(diethyl-amino)-ethanol-(1) dihydrochloride and bromine.

EXAMPLE 21

Using a procedure analogous to that described in Example 1, 1-(4' - amino - 3',5' - dibromo - phenyl)-2-(n-propyl-amino)-ethanol-(1) and its hydrochloride, M.P. 181–182° C. (decomp.), of the formula

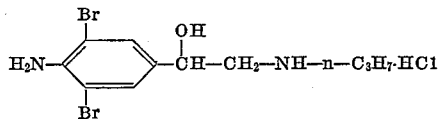

were prepared from 1-(4'-amino - prenyl)-2-(n-propyl-amino)-ethanol-(1) hydrochloride and bromine.

EXAMPLE 22

Using a procedure analogous to that described in Example 1, 1 - (4' - amino - 3',5' - dibromo - phenyl)-2-(isopropyl-amino)-ethanol-(1) and its hydrochloride, M.P. 196.5–197° C. (decomp.), of the formula

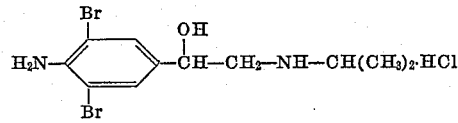

were prepared from 1-(4' - amino - phenyl)-2-(isopropyl-amino)-ethanol-(1) and bromine.

EXAMPLE 23

Using a procedure analogous to that described in Example 1, 1 - (4' - amino - 3',5' - dibromo - phenyl)-2-(di-n-propyl-amino)-ethanol-(1) and its hydrochloride, M.P. 182–184° C. (decomp.), of the formula

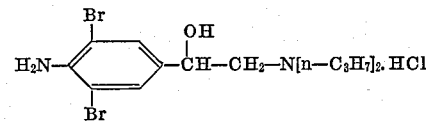

were prepared from 1-(4' - amino-phenyl)-2-(di-n-propyl-amino)-ethanol-(1) and bromine.

EXAMPLE 24

Using a procedure analogous to that described in Example 1, 1 - (4' - amino - 3',5' - dibromo - phenyl)-2-(diisopropylamino)-ethanol-(1) and its hydrobromide, M.P. 176–177° C. (decomp.), were prepared from 1-(4'-amino - phenyl) - 2 - (diisopropyl - amino)-ethanol-(1) hydrochloride and bromine.

EXAMPLE 25

Using a procedure analogous to that described in Example 1, 1 - (4' - amino - 3',5' - dibromo - phenyl)-2-(n-butyl-amino)-ethanol-(1) and its hydrochloride, M.P. 166–168° C. (decomp.), of the formula

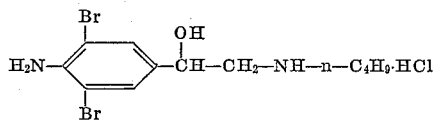

were prepared from 1-(4'-amino-phenyl)-2-(n-butyl-amino)-ethanol-(1) hydrochloride and bromine.

EXAMPLE 26

Using a procedure analogous to that described in Example 1, 1-(4-'-amino-3',5'-dibromo-phenyl) - 2 - (sec. butyl-amino)-ethanol-(1) and its hydrochloride, M.P. 151–153° C. (decomp.), were prepared from 1-(4'-amino-phenyl)-2-(sec. butyl-amino)-ethanol-(1) hydrochloride and bromine.

EXAMPLE 27

Using a procedure analogous to that described in Example 1, 1-(4'-amino-3',5'-dichloro-phenyl) - 2 - (tert. butyl-amino)-ethanol-(1) and its hydrochloride, M.P. 174–175.5° C. (decomp.), were prepared from 1-(4'-amino-phenyl)-2-(tert.butyl-amino)-ethanol-(1) dihydrochloride and chlorine.

EXAMPLE 28

Using a procedure analogous to that described in Example 1, 1-(4'-amino-3',5'-dibromo-phenyl)-2-(dibutyl-amino)-ethanol-(1) and its dihydrochloride, M.P. 176–178° C. (decomp.), of the formula

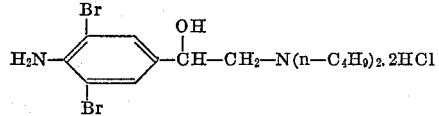

were prepared from 1 - (4' - amino - phenyl)-2-(dibutyl-amino)-ethanol-(1) and bromine.

EXAMPLE 29

Using a procedure analogous to that described in Example 1, 1-(4'-amino-3',5'-dibromo-phenyl)-2-[(β-diethyl-amino-ethyl)-amino]-ethanol-(1), M.P. 120–122° C., of the formula

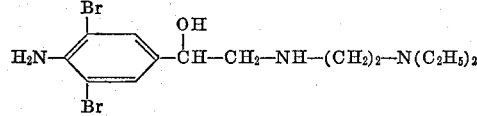

was prepared from 1-(4'-amino-phenyl)-2-[(β-diethyl-amino - ethyl) - amino]-ethanol-(1) dihydrochloride and bromine.

EXAMPLE 30

Using a procedure analogous to that described in Example 1, 1-(4'-amino - 3',5' - dibromo - phenyl)-2-[(γ-methoxy-n-propyl)-amino]-ethanol-(1) and its hydrochloride, M.P. 115–117° C. (decomp.), of the formula

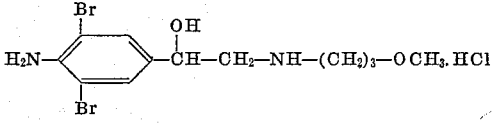

were prepared from 1-(4'-amino-phenyl)-2-[(γ-methoxy-n-propyl)-amino]-ethanol-(1) dihydrochloride and bromine.

EXAMPLE 31

Using a procedure analogous to that described in Example 1, 1-(4'-amino-3',5'-dibromo-phenyl)-2-cyclohexyl-amino-ethanol-(1) and its hydrochloride, M.P. 131–132° C. (decomp.), of the formula

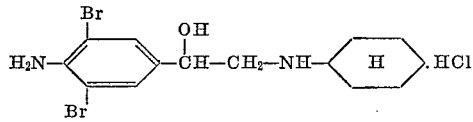

were prepared from 1-(4'-amino-phenyl)-2-cyclohexyl-amino-ethanol-(1) hydrochloride and bromine.

EXAMPLE 32

Using a procedure analogous to that described in Example 1, 1-(4'-amino-3',5'-dibromo - phenyl) - 2 - (N-methyl-cyclohexylamino)-ethanol-(1) and its hydrochloride, M.P. 201–202° C. (decomp.), of the formula

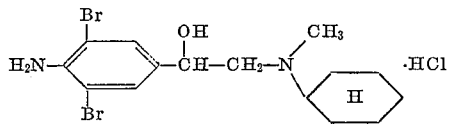

were prepared from 1-(4'-amino)-phenyl)-2-(N-methyl-cyclohexylamino)-ethanol-(1) hydrochloride and bromine.

EXAMPLE 33

Using a procedure analogous to that described in Example 1, 1-(4' - amino-3',5' - dibromo - phenyl)-2-(N-ethyl-cyclohexylamino)-ethanol-(1) and its hydrochloride, M.P. 196–197° C. (decomp.), were prepared from 1-(4'-amino-phenyl)-2-(N - ethyl - cyclohexylamino) - ethanol-(1) hydrochloride and bromine.

EXAMPLE 34

Using a procedure analogous to that described in Example 1, 1-(4'-amino-3',5'-dibromo-phenyl)-2-dicyclohexylamino-ethanol-(1) and its hydrochloride, M.P. 301–303° C. (decomp.), were prepared from 1-(4'-amino-phenyl)-2-dicyclohexylamino - ethanol-(1) hydrochloride and bromine.

EXAMPLE 35

Using a procedure analogous to that described in Example 1, 1-(4'-amino - 3',5' - dibromo-phenyl)-2-(adamantyl-amino)-ethanol-(1) and its hydrochloride, M.P. 210–210.5° C. (decomp.), of the formula

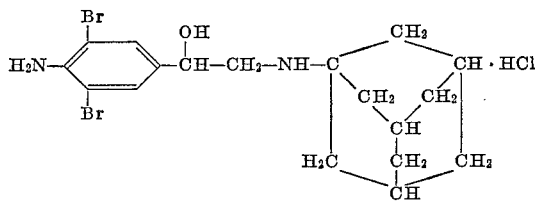

were prepared from 1-(4'-amino-phenyl)-2-(adamantyl-amino)-ethanol-(1) dihydrochloride and bromine.

EXAMPLE 36

Using a procedure analogous to that described in Example 1, 1-(2'-amino - 3',5' - dibromo - phenyl)-2-(N-ethyl-benzylamino)-ethanol-(1), a thin-layer chromatographically uniform oil, $R_f=0.4$ (silicagel, chloroform:methanol=9:1), of the formula

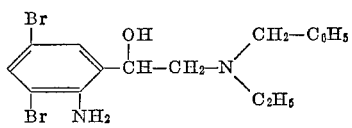

was prepared from 1-(2'-amino-phenyl) - 2 - (N-ethyl-benzylamino)-ethanol-(1) hydrochloride and bromine.

EXAMPLE 37

Using a procedure analogous to that described in Example 1, 1-(4' - amino - 3',5' - dibromo-phenyl)-2-pyrrolidino-ethanol-(1) and its hydrochloride, M.P. 167–168° C. (decomp.), of the formula

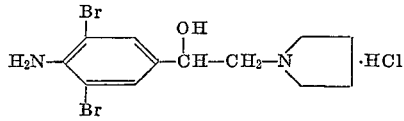

were prepared from 1-(4'-amino-phenyl)-2-pyrrolidino-ethanol-(1) hydrochloride and bromine.

EXAMPLE 38

Using a procedure analogous to that described in Example 1, 1-(4'-amino-3',5'-dibromo-phenyl) - 2-pipedinoethanol-(1) and its hydrochloride with 1 mol of methanol of crystallization, M.P. 190–191° C. (decomp.), of the formula

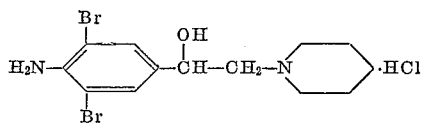

were prepared from 1-(4'-amino-phenyl) - 2-piperidino-ethanol-(1) hydrochloride and bromine.

EXAMPLE 39

Using a procedure analogous to that described in Example 1, 1 - (4'-amino-3',5'-dibromo-phenyl) - 2-(2''-methylpiperidino) - ethanol-(1) and its hydrochloride, M.P. 196–197° C. (decomp.), of the formula

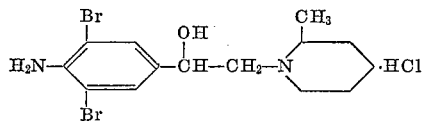

were prepared from 1-(4'-amino-phenyl)-2-(2''-methyl-piperidino)-ethanol-(1) hydrochloride and bromine.

EXAMPLE 40

Using a procedure analogous to that described in Example 1, 1-(4'-amino-3',5'-dibromo-phenyl) - 2 - hexamethyleneimino-ethanol-(1) and its hydrochloride, M.P. 190–191° C. (decomp.), of the formula

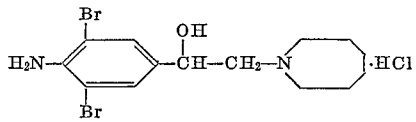

were prepared from 1-(4'-amino-phenyl)-2-hexamethyleneimino-ethanol-(1) hydrochloride and bromine.

EXAMPLE 41

Using a procedure analogous to that described in Example 1, 1 - (4'-amino-3',5'-dibromo-phenyl)-2-(N'-methylpiperazino) - ethanol - (1) and its dihydrochloride with ½ mol of ethanol of crystallization, M.P. 201–202° C. (decomp.), of the formula

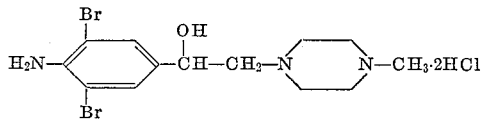

were prepared from 1-(4'-amino-phenyl)-2-(N'-methyl-piperazino)-ethanol-(1) and bromine.

EXAMPLE 42

Using a procedure analogous to that described in Example 1, 1-(4'-amino-3',5'-dibromo-phenyl) - 2-morpholinoethanol-(1) and its dihydrochloride, M.P. 130–130.5° C. (decomp.), of the formula

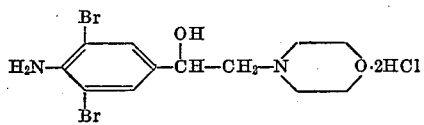

were prepared from 1-(4'-amino-phenyl) - 2-morpholino-ethanol-(1) hydrochloride and bromine.

EXAMPLE 43

Using a procedure analogous to that described in Example 1, 1-(4'-amino-3',5'-dibromo-phenyl) - 2-(β-hydroxy-ethyl-amino)-thanol-(1) and its thin-layer chromatographically uniform hydrochloride, of the formula

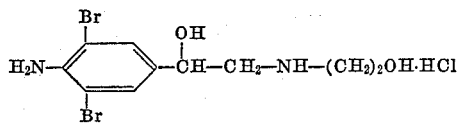

were prepared from 1-(4'-amino-phenyl)-2-(β-hydroxy-ethyl-amino)-ethanol-(1) dihydrochloride and bromine.

EXAMPLE 44

Using a procedure analogous to that described in Example 1, 1 - (4'-amino-3',5'-dibromo-phenyl)-2-camphidino-ethanol-(1) and its hydrobromide, M.P. 207.5–208° C. (decomp.), of the formula

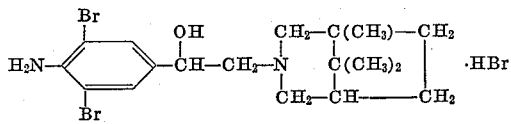

were prepared from 1 - (4'-amino-phenyl)-2-camphidino-ethanol-(1) hydrochloride and bromine.

EXAMPLE 45

Using a procedure analogous to that described in Example 1, 1-(4'-amino-3',5'-dibromo-phenyl) - 2-ethyl-amino-ethane and its hydrochloride, M.P. 252–254° C. (decomp.), were prepared from 1-(4'-amino-phenyl)-2-ethylamino-ethane hydrochloride and bromine.

EXAMPLE 46

Using a procedure analogous to that described in Example 1, 1 - (4' - amino-3',5'-dibromo-phenyl)-2-(n-propyl-amino)-ethane and its hydrochloride, M.P. 262–264° C. (decomp.) were prepared from 1-(4'-amino-phenyl) - 2-(n-propyl-amino)-ethane hydrochloride and bromine.

EXAMPLE 47

Using a procedure analogous to that described in Example 1, 1 - (4'-amino-3',5'-dibromo-phenyl)-2-(iso-propyl-amino)-ethane and its hydrochloride, M.P. 233–235° C. (decomp.), were prepared from 1-(4'-amino-phenyl) - 2-(isopropyl-amino)-ethane hydrochloride and bromine.

EXAMPLE 48

Using a procedure analogous to that described in Example 1, 1 - (4' - amino-3',5'-dibromo-phenyl)-2-(n-butyl-amino)-ethane and its hydrochloride, M.P. 234–236° C. (decomp.), were prepared from 1-(4'-amino-phenyl) - 2-(n-butyl-amino)-ethane hydrochloride and bromine.

EXAMPLE 49

Using a procedure analogous to that described in Example 1, 1 - (4' - amino - 3',5' - dibromo - phenyl) - 2-(tert. butylamino) - ethane and its hydrochloride, M.P. 260–263° C. (decomp.), were prepared from 1-(4'-amino-phenyl)-2-(tert. butyl-amino)-ethane hydrochloride and bromine.

EXAMPLE 50

Using a procedure analogous to that described in Example 1,1-(4'-amino-3,5'-dibromo-phenyl)-2-(γ-methoxy-n-propyl-amino)-ethane and its hydrochloride, M.P. 151–153° C. (decomp.), of the formula

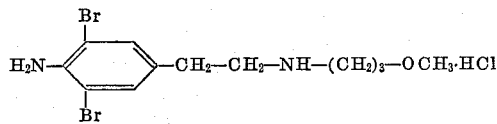

were prepared from 1-(4'-amino-phenyl)-2-(γ-methoxy-n-propyl-amino)-ethane hydrochloride and bromine.

EXAMPLE 51

Using a procedure analogous to that described in Example 1, 1-(4'-amino-3',5'-dibromo-phenyl)-2-(cyclohexylamino)-ethane and its hydrochloride, M.P. 249–251° C. (decomp.), were prepared from 1-(4'-amino-phenyl)-2-(cyclohexyl-amino)-ethane hydrochloride and bromine.

EXAMPLE 52

Using a procedure analogous to that described in Example 1, 1-(4'-amino-3',5'-dibromo-phenyl)-2-(di-n-butylamino)-ethane and its hydrochloride, M.P. 154–156° C. (decomp.), were prepared from 1-(4'-amino-phenyl) - 2 - (di - n - butyl - amino)-ethane dihydrochloride and bromine.

EXAMPLE 53

Using a procedure analogous to that described in Example 1, 1-(4'-amino-3',5'-dibromo-phenyl)-2-(N-cyclohexyl-methylamino-ethane and its hydrochloride, M.P. 100–103° C. (decomp.), were prepared from 1-(4'-amino-phenyl)-2-(N-cyclohexyl-methylamino)-ethane dihydrochloride and bromine.

EXAMPLE 54

Using a procedure analogous to that described in Example 1, 1-(4'-amino-3',5'-dibromo-phenyl)-2-pyrolidino-ethane and its hydrochloride, M.P. 201–204° C. (decomp.), of the formula

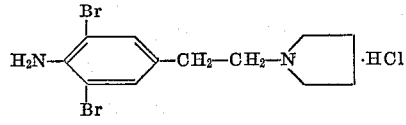

were prepared from 1-(4'-amino-phenyl)-2-pyrrolidino-ethane hydrochloride and bromine.

EXAMPLE 55

Using a procedure analogous to that described in Example 1, 1 - (4' - amino - 3',5' -dibromo - phenyl)-2-n-propyl-2-pyrrolidino-ethane and its hydrochloride, M.P. 140–142° C. (decomp.), of the formula

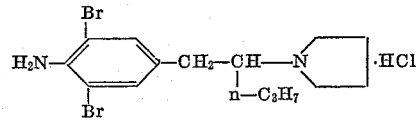

were prepared from 1-(4'-amino-phenyl)-2-n-propyl-2-pyrrolidino-ethane and bromine.

EXAMPLE 56

Using a procedure analogous to that described in Example 1, 1-(4'-amino-3,5'-dibromo-phenyl)-2-piperidino-ethane and its hydrochloride, M.P. 242–244° C. (decomp.), were prepared from 1-(4'-amino-phenyl-2-piperidino-ethane hydrochloride and bromine.

EXAMPLE 57

Using a procedure analogous to that described in Example 1, 1-(4'-amino-3',5'-dibromo-phenyl)-2-morpholino-ethane and its hydrochloride, M.P. 248–251° C.

(decomp.) were prepared from 1-(4'-amino-phenyl)-2-morpholino-ethane hydrochloride and bromine.

EXAMPLE 58

Using a procedure analogous to that described in Example 1, 1-(4'-amino-3',5'-dibromo-phenyl)-2-hexamethylene-imino-ethane and its hydrochloride, M.P. 244–246° C. were prepared from 1-(4'-amino-phenyl)-2-hexamethyleneimino-ethane hydrochloride and bromine.

EXAMPLE 59

Using a procedure analogous to that described in Example 3, 1-(2'-amino-3',5'-dibromo-phenyl)-2-(diallyl-amino)-ethanol-(1) and its hydrochloride, M.P. 162–164° C. (decomp.), of the formula

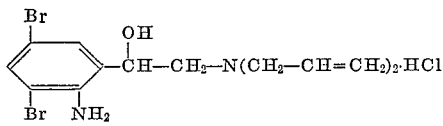

were prepared from 2'-amino-2-(diallyl-amino)-3'5'-dibromo-acetophenone.

EXAMPLE 60

Using a procedure analogous to that described in Example 3, 1 - (2'-amino-3',5'-dibromo-phenyl)-2-(dipropargylamino)-ethanol-(1) and its hydrochloride, M.P. 160–162° C., of the formula

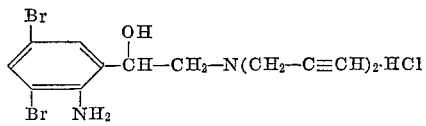

were prepared from 2'-amino-3',5'-dibromo-2-(dipropargyl-amino)-acetophenone.

EXAMPLE 61

Using a procedure analogous to that described in Example 3, 1 - (2' - amino - 3',5' - dibromo - phenyl) - 2-(N-methyl-anilino)-ethanol-(1) and its hydrochloride, M.P. 146–147° C. (decomp.), of the formula

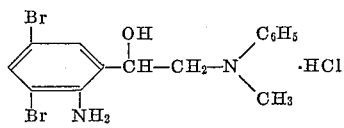

were prepared from 2'-amino-3',5'-dibromo-2-(N-methyl-anilino)-acetophenone.

EXAMPLE 62

Using a procedure analogous to that described in Example 3, 1-(2'-amino-3',5'-dibromo-phenyl)-2-(di-n-propylamino)-ethanol-(1) and its hydrochloride, M.P. 186–187° C., were prepared from 2'-amino-3',5'-dibromo-2-(di-n-propylamino)-acetophenone.

EXAMPLE 63

Using a procedure analogous to that described in Example 1, 1 - (2' - amino-3',5'-dibromo-phenyl)-2-(diethyl-amino)-ethane and its hydrochloride, M.P. 160–161° C., were prepared from 1 - (2' - amino - phenyl)-2-(diethyl-amino)-ethane and bromine.

EXAMPLE 64

Using a procedure analogous to that described in Example 3, 1 - (2' - amino-3',5'-dibromo-phenyl)-2-(diethyl-amino)-propanol-(1) and its hydrochloride, M.P. 247–248° C. (decomp.), of the formula

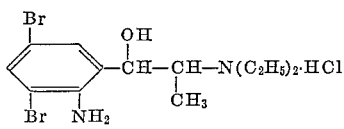

were prepared from 2' - amino - 3',5'-dibromo-2-(diethyl-amino)-propiophenone.

EXAMPLE 65

Using a procedure analogous to that described in Example 1, 1 - (3' - amino-4',6'-dibromo-phenyl)-2-(methyl-amino)-propanol-(1) and its hydrochloride, M.P. 244° C. (decomp.), were prepared from 1-(3'-amino-phenyl)-2-(methyl-amino)-propanol-(1) dihydrochloride and bromine.

EXAMPLE 66

Using a procedure analogous to that described in Example 1, 1 - (3' - amino - 4',6'-dibromo-phenyl)-2-(ethyl-amino-propanol-(1) and its hydrochloride, M.P. 244° C. (decomp.), were prepared from 1-(3'-amino-phenyl)-2-(ethylamino)-propanol-(1) dihydrochloride and bromine.

EXAMPLE 67

Using a procedure analogous to that described in Example 1, 1 - (2' - amino-3'-bromo-5'-chloro-phenyl)-2-diethylamino)-ethanol-(1) and its hydrochloride, M.P. 165° C., of the formula

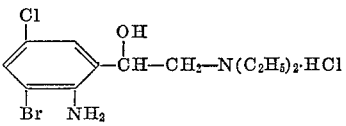

were prepared from 1-(2'-amino-5'-chloro-phenyl)-2-(diethylamino)-ethanol-(1) hydrochloride and bromine.

EXAMPLE 68

Preparation of 1 - (4' - amino - 3',5' - dibromo-phenyl)-2-diethylamino-ethane and its hydrochloride by Method D 5 gm. of β - (4' - amino - 3',5' - dibromo-phenyl)-ethylbromide were dissolved in 100 cc. of ethanol, 2.3 gm. of diethylamine were added to the solution, and the mixture was refluxed for 22 hours. Thereafter, the reaction solution was evaporated, the residue was taken up in 2 N hydrochloric acid, and the acid solution was extracted three times with chloroform. The aqueous phase was then made alkaline with concentrated ammonia and was again extracted twice with chloroform. The organic extract solutions were combined, dried with sodium sulfate and evaporated. The residue, the free base 1-(4'-amino-3',5'-dibromo-phenyl)-2-diethylamino-ethane, was dissolved in ethanolic hydrochloric acid, and ether was added to the acid ethanolic solution. The precipitate formed thereby was collected and recrystallized from absolute ethanol. 1 - (4' - amino - 3',5' - dibromo - phenyl)-2-diethylamino-ethane hydrochloride, M.P. 205–207° C., was obtained.

EXAMPLE 69

Preparation of 1 - (2' - amino - 3',5' - dibromo-phenyl)-2-diethylamino-ethanol-(1) and its hydrochloride by Method D 5 gm. of 1-(2'-amino-3',5'-dibromo-phenyl)-2-bromo-ethanol-(1) were dissolved in 200 cc. of carbontetrachloride, 28 cc. of diethylamine were added to the solution, and the mixture was refluxed for 48 hours. Thereafter, the reaction solution was evaporated in vacuo, and the residue was distributed between ether and water. The organic phase was separated, washed with water, dried with sodium sulfate and evaporated in vacuo. The oily residue was purified with chloroform/methanol (9:1) in a chromatographic column over silicagel, and the product, the free base 1 - (2'-amino-3',5'-dibromo-phenyl)-2-diethylamino-ethanol-(1), was taken up in ether, and the solution was acidified with isopropanolic hydrochloric acid. The precipitate formed thereby was collected and recrystallized from isopropanol, yielding 1-(2'-amino-3',5'-dibromo-phenyl)-2 - diethylamino - ethanol-(1) monohydrochloride, M.P. 177–178° C.

EXAMPLE 70

Preparation of 1 - (4' - amino - 3',5' - dibromo-phenyl)-2-dimethylamino-ethane and its hydrochloride by Method C A mixture of 18.6 gm. of 4-amino-3,5-dibromo-α-dimethylamino-acetophenone hydrochloride, 12.5 gm. of 80% hydrazine hydrate and 100 cc. of triethyleneglycol was refluxed for 30 minutes. Thereafter, a solution of 10 gm. of potassium hydroxide in 20 cc. of water was slowly added to the reaction mixture, and the mixture was again refluxed for half an hour. Subsequently, the water and the excess hydrazine hydrate were distilled off, and the residual solution was heated for two hours at 190–200° C. The solution was allowed to cool, was diluted with 0.5 liter of water and was extracted three times with 200 cc.-portions of ether. The ether extract solutions were combined, dried over sodium sulfate and evaporated. The oily residue was passed through a chromatographic silicagel column, the column was eluted with acetone and with ethanol, the eluates were combined and evaporated, the residue was dissolved in 150 cc. of 2 N acetic acid, and the resulting solution was extracted twice with 100 cc.-portions of ether. The aqueous phase was decolorized with activated charcoal, made alkaline with concentrated ammonia, and extracted three times with 150 cc.-portions of ether. The ether extract solutions were combined, dried over sodium sulfate and evaporated. The residue, the free base 1-(4'-amino-3',5'-dibromo-phenyl)-2-dimethylamino-ethane, was dissolved in ethanolic hydrochloric acid, ether was added to the acid solution, and the precipitate was collected. 1 - (4' - amino-3',5'-dibromo-phenyl)-2-(dimethyl-amino-ethane hydrochloride, M.P. 219–221 (decomp.), was obtained.

EXAMPLE 71

Using a procedure analogous to that described in Example 69, 1-(4'-amino-3',5'-dibromo-phenyl)-2-diethyl-amino-ethanol-(1) and its hydrochloride, M.P. 198–199° C. (decomp.), were prepared from 1-(4'-amino-3',5'-dibromophenyl)-2-bromo-ethanol and diethylamine.

EXAMPLE 72

Using a procedure analogous to that described in Example 69, 1-(4'-amino-3',5'-dichloro-phenyl)-2-diethyl-amino-ethanol-(1) and its hydrochloride, M.P. 152–154° C. (decomp.), were prepared from 1-(4'-amino-3',5'-dichlorophenyl)-2-bromo-ethanol and diethylamine.

EXAMPLE 73

Using a procedure analogous to that described in Example 70, 1-(4'-amino-3',5'-dibromo-phenyl)-2-amino-ethane and its hydrochloride, M.P. 278–280° C. (decomp.), were prepared from 4-amino-3,5-dibromo-α-amino-acetophenone and hydrazine hydrate.

EXAMPLE 74

Using a procedure analogous to that described in Example 69, 1-(4'-amino - 3',5' - dibromo-phenyl)-2-amino-ethanol-(1) and its hydrochloride, M.P. 214–216° C. (decomp.), were prepared from 1-(4'-amino-3',5'-dibromo-phenyl)-2-bromo-ethanol and ammonia.

EXAMPLE 75

Using a procedure analogous to that described in Example 70, 1-(4'-amino-3',5'-dibromo-phenyl)-2-methyl-2-amino-propane and its hydrochloride, M.P. 253–254° C. (decomp.), were prepared from 4-amino-3,5'-dibromo-α,α-dimethyl-α-amino-acetophenone and hydrazine hydrate.

EXAMPLE 76

Using a procedure analogous to that described in Example 68, 1-(4'-amino - 3',5' - dibromo-phenyl)-2-methyl-amino-ethane and its hydrochloride, M.P. 221–222° C., were prepared from 1-(4'-amino-3',5'-dibromo-phenyl)-2-bromo-ethane and methylamine.

EXAMPLE 77

Using a procedure analogous to that described in Example 69, 1-(4'-amino-3',5'-dibromo-phenyl)-2-methyl-amino-ethanol-(1) and its hydrochloride, M.P. 210–216° C. (decomp.), were prepared from 1-(4'-amino-3',5'-dibromo-phenyl)-2-bromo-ethanol and methylamine.

EXAMPLE 78

Using a procedure analogous to that described in Example 69, 1-(2'-amino-3',5'-dibromo-phenyl)-2-dimethyl-amino-ethanol-(1) and its hydrochloride, M.P. 189–190° C. (decomp.), were prepared from 1-(2'-amino-3',5'-dibromo-phenyl)-2-bromo-ethanol and dimethylamine.

EXAMPLE 79

Using a procedure analogous to that described in Example 69, 1-(2'-amino - 3',5' - dibromo-phenyl)-2-ethyl-amino-ethanol-(1) and its hydrobromide, M.P. 184–185° C. (decomp.), were prepared from 1-(2'-amino-3',5'-dibromo-phenyl)-2-bromo-ethanol and ethylamine.

EXAMPLE 80

Using a procedure analogous to that described in Example 69, 1-(4'-amino-3',5'-dibromo-phenyl)-2-(N-methyl-ethylamino)-ethanol-(1) and its dihydrochloride, M.P. 118–121° C. (decomp.), were prepared from 1-(4'-amino-3',5'-dibromo-phenyl)-2-bromo-ethanol and N-methylethylamine.

EXAMPLE 81

Using a procedure analogous to that described in Example 69, 1-(3'-amino-4',6'-dibromo - phenyl)-2-diethyl-amino-ethanol-(1) and its hydrochloride, M.P. 190–191° C. (decomp.), were prepared from 1-(3'-amino-4',6'-dibromo-phenyl)-2-bromo-ethanol and diethylamine.

EXAMPLE 82

Using a procedure analogous to that described in Example 69, 1-(4'-amino-3',5'-dibromo-phenyl)-2-n-propyl-amino-ethanol-(1) and its hydrochloride, M.P. 181–182° C. (decomp.), were prepared from 1-(4'-amino-3',5'-dibromo-phenyl)-2-bromo-ethanol and n-propylamine.

EXAMPLE 83

Using a procedure analogous to that described in Example 69, 1-(4'-amino-3',5'-dibromo-phenyl)-2-diisopropylamino-ethanol-(1) and its hydrobromide, M.P. 176–177° C. (decomp.), were prepared from 1-(4'-amino-3',5'-dibromo-phenyl)-2-bromo-ethanol and diisopropylamine.

EXAMPLE 84

Using a procedure analogous to that described in Example 69, 1-(4'-amino-3',5'-dibromo-phenyl)-2-sec. butyl-amino-ethanol-(1) and its hydrochloride, M.P. 151–153° C. (decomp.), were prepared from 1-(4'-amino-3',5'-dibromo-phenyl)-2-bromo-ethanol and sec. butylamine.

EXAMPLE 85

Using a procedure analogous to that described in Example 69, 1-(4'-amino-3',5'-dibromo-phenyl)-2-di-n-butyl-amino-ethanol-(1) and its dihydrochloride, M.P. 176–182° C. (decomp.), were prepared from 1-(4'-amino-3',5'-dibromo-phenyl)-2-bromo-ethanol and di-n-butylamine.

EXAMPLE 86

Using a procedure analogous to that described in Example 69, 1-(4'-amino-3',5'-dibromo-phenyl)-2-[(β-diethyl-amino-ethyl)-amino]-ethanol-(1), M.P. 120–122° C., was prepared from 1-(4'-amino-3',5'-dibromo-phenyl)-2-bromo-ethanol and N,N-diethyl-ethylenediamine.

EXAMPLE 87

Using a procedure analogous to that described in Example 69, 1-(4'-amino - 3',5' - dibromo-phenyl)-2-[(γ-methoxy-n-propyl)-amino]-ethanol-(1) and its hydrochloride, M.P. 115–117° C. (decomp.), were prepared from 1-(4'-amino-3',5'-dibromo-phenyl)-2-bromo - ethanol and (γ-methoxy-n-propyl)-amine.

EXAMPLE 88

Using a procedure analogous to that described in Example 69, 1-(4'-amino-3',5'-dibromo-phenyl)-2-cyclohexylamino-ethanol-(1) and its hydrochloride, M.P. 131–132° C. (decomp.), were prepared from 1-(4'-amino-3',5'-dibromo-phenyl)-2-bromo-ethanol and cyclohexylamine.

EXAMPLE 89

Using a procedure analogous to that described in Example 69, 1-(4'-amino-3',5'-dibromo-phenyl)-2-N-ethyl-cyclohexylamino)-ethanol-(1) and its hydrochloride, M.P. 196–197° C. (decomp.), were prepared from 1-(4'-amino-3',5'-dibromo-phenyl)-2-bromo-ethanol and N-ethyl-cyclohexylamine.

EXAMPLE 90

Using a procedure analogous to that described in Example 69, 1-(4'-amino-3',5'-dibromo-phenyl)-2-dicyclohexylamino-ethanol-(1) and its hydrochloride, M.P. 301–302° C. (decomp.), were prepared from 1-(4'-amino-3',5'-dibromo-phenyl)-2-bromo-ethanol and dicyclohexylamine.

EXAMPLE 91

Using a procedure analogous to that described in Example 69, 1 - (4' - amino - 3',5' - dibromo - phenyl)-2-adamantyl-amino-ethanol-(1) and its hydrochloride, M.P. 210–210.5° C. (decomp.), were prepared from 1-(4'-amino-3',5'-dibromo-phenyl)-2-bromo-ethanol and adamantylamine.

EXAMPLE 92

Using a procedure analogous to that described in Example 69, 1-(2'-amino-3',5'-dibromo-phenyl) - 2 - (N-ethyl-benzylamino)-ethanol-(1), an oil, thin-layer chromatographically uniform, $R_f$=0.4 (silicagel, chloroform: methanol=9:1), was prepared from 1-(2'-amino-3',5'-dibromo - phenyl) - 2 - bromo - ethanol and N - ethyl-benzylamine.

EXAMPLE 93

Using a procedure analogous to that described in Example 69, 1 - (4' - amino - 3',5' - dibromo - phenyl) - 2-pyrrolidino-ethanol-(1) and its hydrochloride, M.P. 167–168° C. (decomp.), were prepared from 1-(4'-amino-3',5'-dibromo-phenyl)-2-bromo-ethanol and pyrrolidine.

EXAMPLE 94

Using a procedure analogous to that described in Example 69, 1 - (4' - amino - 3',5' - dibromo - phenyl) - 2-piperidino-ethanol-(1) and its hydrochloride with 1 mol of methanol of crystallization, M.P. 190–191° C. (decomp.), were prepared from 1-(4'-amino-3',5'-dibromo-phenyl)-2-bromo-ethanol and piperidine.

EXAMPLE 95

Using a procedure analogous to that described in Example 69, 1 - (4 - amino - 3,5' - dibromo - phenyl) - 2-(2''-methyl-piperidino)-ethanol-(1) and its hydrochloride, M.P. 196–197° C. (decomp.), were prepared from 1-(4'-amino - 3',5' - dibromo - phenyl) - 2 - bromo - ethanol and 2-methyl-piperidine.

EXAMPLE 96

Using a procedure analogous to that described in Example 69, 1-(4'-amino-3',5'-dibromo - phenyl) - 2 - hexamethyleneimino-ethanol-(1) and its hydrochloride, M.P. 190–191° C. (decomp.), were prepared from 1-(4'-amino-3',5'-dibromo-phenyl)-2-bromo-ethanol and hexamethyleneimine.

EXAMPLE 97

Using a procedure analogous to that described in Example 69, 1 - (4' - amino - 3',5' - dibromo - phenyl) - 2-(N'-methyl-piperazino)-ethanol-(1) and its hydrochloride with ½ mol of ethanol of crystallization, M.P. 201–202° C. (decomp.), were prepared from 1-(4'-amino-3',5'-dibromo-phenyl)-2-bromo-ethanol and N-methyl-piperazine.

EXAMPLE 98

Using a procedure analogous to that described in Example 69, 1 - (4' - amino - 3',5' - dibromo - phenyl) - 2-morpholino-ethanol-(1) and its dihydrochloride, M.P. 130–135.5° C. (decomp.), were prepared from 1-(4'-amino-3',5'-dibromo-phenyl)-2-bromo-ethanol and morpholine.

EXAMPLE 99

Using a procedure analogous to that described in Example 69, 1 - (4' - amino - 3',5' - dibromo - phenyl)-2[(β-hydroxy-ethyl)-amino] - ethanol - (1), a thin-layer chromatographically uniform oil, was prepared from 1-(4'-amino - 3',5' - dibromo - phenyl) - 2 - bromo - ethanol and (β-hydroxy-ethyl)-amine.

EXAMPLE 100

Using a procedure analogous to that described in Example 69, 1 - (4' - amino - 3',5' - dibromo - phenyl) - 2-camphidino-ethanol-(1) and its hydrobromide, M.P. 207.5–208° C. (decomp.), were prepared from 1-(4'-amino-3',5'-dibromo-phenyl)-2-bromo-ethanol and camphidine.

EXAMPLE 101

Using a procedure analogous to that described in Example 68, 1 - (4' - amino - 3',5' - dibromo - phenyl) - 2-n-butyl-amino-ethane and its hydrochloride, M.P. 234–236° C. (decomp.), were prepared from 1-(4'-amino-3',5'-dibromo-phenyl)-2-bromo-ethane and n-butylamine.

EXAMPLE 102

Using a procedure analogous to that described in Example 68, 1 - (4' - amino - 3',5' - dibromo - phenyl) - 2-[(γ-methoxy-n-propyl)-amino]-ethane and its hydrochloride, M.P. 151–152° C. (decomp.), were prepared from 1 -(4' - amino - 3',5' - dibromo - phenyl) - 2 - bromo-ethane and (γ-methoxy-n-propyl)-amine.

EXAMPLE 103

Using a procedure analogous to that described in Example 68, 1 - (4' - amino - 3',5' - dibromo - phenyl) - 2-(N-cyclo-hexyl-N-methyl-amino)-ethane and its hydrochloride, M.P. 100–103° C. (decomp.), were prepared from 1 - (4' - amino - 3',5' - dibromo - phenyl) - 2 - bromo-ethane and N-cyclohexyl-methyl-amine.

EXAMPLE 104

Using a procedure analogous to that described in Example 68, 1 - (4' - amino - 3',5' - dibromo - phenyl) - 2-pyrrolidino-ethane and its hydrochloride, M.P. 201–204° C. (decomp.), were prepared from 1-(4'-amino-3',5'-dibromo-phenyl)-2-bromo-ethane and pyrrolidine.

EXAMPLE 105

Using a procedure analogous to that described in Example 68, 1 - (4' - amino - 3',5' - dibromo - phenyl) - 2-pyrrolidino-pentane and its hydrochloride, M.P. 140–142° C. (decomp.), were prepared from 1-(4'-amino-3',5'-dibromo-phenyl)-2-bromo-pentane and pyrrolidine.

EXAMPLE 106

Using a procedure analogous to that described in Example 68, 1-(4'-amino-3',5'-dibromo-phenyl)-2-piperidino-ethane and its hydrochloride, M.P. 242–244° C. (decomp.), were prepared from 1-(4'-amino-3',5'-dibromo-phenyl)-2-bromo-ethane and piperidine.

EXAMPLE 107

Using a procedure analogous to that described in Example 68, 1-(4'-amino-4',5'-dibromo-phenyl)-2-morpholino-ethane and its hydrochloride, M.P. 248–251° C. (decomp.), were prepared from 1-(4'-amino-3',5'-dibromo-phenyl)-2-bromo-ethane and morpholine.

EXAMPLE 108

Using a procedure analogous to that described in Example 68, 1-(4'-amino-3',5'-dibromo-phenyl)-2-hexamethyleneimino-ethane and its hydrochloride, M.P. 244–246° C. (decomp.), were prepared from 1-(4'-amino-3',5'-dibromo-phenyl)-2-bromo-ethane and hexamethyleneimine.

EXAMPLE 109

Using a procedure analogous to that described in Example 69, 1-(2'-amino-3',5'-dibromo-phenyl)-2-diallylamino-ethanol-(1) and its hydrochloride, M.P. 162–164° C., were prepared from 1-(2'-amino-3',5'-dibromo-phenyl)-2-bromo-ethanol and diallylamine.

EXAMPLE 110

Using a procedure analogous to that described in Example 69, 1-(2'-amino-3',5'-dibromo-phenyl)-2-dipropargylamino-ethanol-(1) and its hydrochloride, M.P. 160–162° C., were prepared from 1-(2'-amino-3',5'-dibromo-phenyl)-2-bromo-ethanol and dipropargylamine.

EXAMPLE 111

Using a procedure analogous to that described in Example 69, 1-(2'-amino-3',5'-dibromo-phenyl)-2-(N-methylphenylamino)-ethanol-(1) and its hydrochloride, M.P. 146–147° C., were prepared from 1-(2'-amino-3',5'-dibromo-phenyl)-2-bromo-ethanol and N-methyl-aniline.

EXAMPLE 112

Using a procedure analogous to that described in Example 69, 1-(2'-amino-3',5'-dibromo-phenyl)-2-diethylamino-propanol-(1) and its hydrochloride, M.P. 247–248° C. (decomp.), were prepared from 1-(2'-amino-3',5'-dibromo-phenyl)-2-bromo-propanol-(1) and diethylamine.

EXAMPLE 113

Using a procedure analogous to that described in Example 69, 1-(3'-amino-4',6'-dibromo-phenyl)-2-ethylamino-propanol-(1) and its hydrochloride, M.P. 244° C. (decomp.), were prepared from 1-(3'-amino-4',6'-dibromo-phenyl)-2-bromo-propanol and ethylamine.

EXAMPLE 114

Using a procedure analogous to that described in Example 69, 1-(2'-amino-3'-bromo-5'-chloro-phenyl)-2-diethylamino-ethanol-(1) and its hydrochloride, M.P. 165° C., were prepared from 1-(2'-amino-3'-bromo-5'-chloro-phenyl)-2-bromo-ethanol and diethylamine.

EXAMPLE 115

Preparation of 1-(4'-amino-3',5'-dibromo-phenyl)-2-diethylamino-ethanol-(1) and its hydrochloride by Method E 8.6 gm. of 1-(3',5'-dibromo-4'-nitro-phenyl)-2-diethylamino-ethanol-(1) hydrochloride were dissolved in 200 cc. of methanol, about 1 gm. of Raney nickel was added to the solution, and the mixture was hydrogenated at atmospheric pressure and room temperature. After about 90 minutes 3 mols of hydrogen had been absorbed. Thereafter, the catalyst was filtered off, and the filtrate was evaporated. The residue was dissolved in 200 cc. of water; the solution was extracted twice with ether; the aqueous phase was made alkaline with 2 N ammonia, and was again extracted twice with ether. The ether extract solutions were combined, dried over sodium sulfate and evaporated. The oily residue was purified by passing it through a chromatographic silica gel column, using ether as the elution agent. The raw product, 1-(4'-amino-3',5'-dibromo-phenyl)-2-diethylamino-ethanol-(1), was dissolved in absolute ethanol; the solution was acidified with ethanolic hydrochloric acid, and ether was added to the acid solution until it became cloudy. The substance which crystallized out was collected and recrystallized from absolute ethanol, yielding 1-(4'-amino-3',5'-dibromo-phenyl)-2-diethylamino-ethanol-(1) hydrochloride, M.P. 198–199° C. (decomp.).

EXAMPLE 116

Preparation of 1-(4'-amino-2',5'-dichloro-phenyl)-2-diethylamino-ethanol-(1) hydrochloride by Method E 9.0 gm. of 1-(2',4'-dichloro-4'-nitro-phenyl)-2-diethylamino-ethanol-(1) hydrochloride were dissolved in 150 cc. of methanol, about 1 gm. of Raney nickel was added to the solution, and the mixture was hydrogenated at atmospheric pressure and room temperature. After about 2 hours 3 mols of hydrogen had been absorbed. Thereafter, the catalyst was filtered off, and the filtrate was evaporated. The residue was dissolved in absolute ethanol, and ether was added to the solution until crystallization began. The crystalline precipitate was collected and recrystallized from absolute ethanol/ether, yielding 1-(4'-amino-2',5'-dichloro-phenyl)-2-diethylamino-ethanol-(1) hydrochloride, M.P. 182–183° C. (decomp.).

EXAMPLE 117

Preparation of 1-(3'-amino-4',6'-dibromo-phenyl)-2-diethylamino-ethanol-(1) hydrochloride by Method F A mixture of 6.0 gm. of 1-(3'-acetylamino-4',6'-dibromo-phenyl)-2-diethylamino-ethanol-(1) hydrochloride and 120 cc. of about 1 N isopropanolic hydrochloric acid was refluxed for about 5 hours. The reaction solution was evaporated in vacuo, and the residue was recrystallized from isopropanol, yielding 1-(3'-amino-4',6'-dibromo-phenyl)-2-diethylamino-ethanol-(1) hydrochloride, M.P. 190–194° C. (decomp.).

EXAMPLE 118

Preparation of 1-(2'-amino-3',5'-dibromo-phenyl)-2-diethylamino-ethanol-(1) and its hydrochloride by Method G 5.0 gm. of (2-amino-3,5-dibromo-phenyl)-glyoxalic acid diethylamide were dissolved in 100 cc. of absolute ether, and, under exclusion of moisture, a total of 750 mgm. of lithium aluminum hydride were added in small portions to the solution while stirring. The mixture was then refluxed for 15 minutes and was thereafter decomposed by carefully adding first 2.0 cc. of water, then 2.4 cc. of 2 N sodium hydroxide, and finally 6.0 cc. of water. The aqueous mixture was then vacuum filtered, and the filtrate, which contained the free base 1-(2'-amino-3',5'-dibromo-phenyl)-2-diethylamino-ethanol-(1), was acidified with hydrochloric acid. The precipitate formed thereby was recrystallized from ethanol, yielding 1-(2'-amino-3',5'-dibromo-phenyl)-2-diethylamino-ethanol-(1) hydrochloride, M.P. 177–178° C.

EXAMPLE 119

Preparation of 1-(2'-amino-3',5'-dibromo-phenyl)-2-diethylamino-ethanol-(1) and its hydrochloride by Method H Using a procedure analogous to that described in Example 118, a solution of 9.0 gm. of (2-amino-3,5-dibromo-phenyl)-glycolic acid diethylamide was reacted with 1.365 gm. of lithium aluminum hydride, the reaction solution was decomposed, the filtrate containing the free base was acidified with hydrochloric acid, and the precipitate was recrystallized from isopropanol. The end product had a melting point of 177–178° C. and was identical to that of Example 118.

EXAMPLE 120

Using a procedure analogous to that described in Example 115, 1-(4'-amino-3',5'-dibromo-phenyl)-2-amino-ethanol-(1) and its hydrochloride, M.P. 214–215° C. (decomp.), were prepared from 1-(4'-nitro-3',5'-dibromo-phenyl)-2-amino-ethanol-(1) hydrochloride.

EXAMPLE 121

Using a procedure analogous to that described in Example 115, 1-(4'-amino-3',5'-dibromo-phenyl)-2-methylamino-ethanol-(1) and its hydrochloride, M.P. 210–216° C. (decomp.), were prepared from 1-(4'-nitro-3',5' - dibromo-phenyl) - 2-methylamino-ethanol-(1) hydrochloride.

EXAMPLE 122

Using a procedure analogous to that described in Example 115, 1 - (4' - amino-3',5'-dibromo-phenyl)-2-dimethylamino-ethanol-(1) and its hydrochloride, M.P. 178–178.5° C. (decomp.), were prepared from 1-(4'-nitro - 3',5' - dibromo-phenyl)-2-dimethylamino-ethanol-(1) hydrochloride.

EXAMPLE 123

Using a procedure analogous to that described in Example 115, 1-(4'-amino-3',5'-dibromo-phenyl)-2-ethylamino-ethanol-(1) and its hydrochloride, M.P. 174–175° C. (decomp.), were prepared from 1-(4'-nitro-3',5'-dibromo-phenyl)-2-ethylamino-ethanol-(1) hydrochloride.

EXAMPLE 124

Using a procedure analogous to that described in Example 115, 1 - (4' - amino-3',5'-dibromo-phenyl)-2-diethylamino-ethanol-(1) and its hydrochloride, M.P. 198–199° C. (decomp.), were prepared from 1-(4'-nitro-3',5'-dibromophenyl) - 2-diethylamino-ethanol-(1) hydrochloride.

EXAMPLE 125

Using a procedure analogous to that described in Example 115, 1 - (4' - amino-3',5'-dibromo-phenyl)-2-n-propylamino-ethanol-(1) and its hydrochloride, M.P. 181–182° C. (decomp.), were prepared from 1-(4'-nitro-3',5' - dibromo-phenyl) - 2 - n - propylamino-ethanol-(1) hydrochloride.

EXAMPLE 126

Using a procedure analogous to that described in Example 115, 1-(4'-amino-3',5'-dibromo-phenyl)-2-(N-methylethylamino)-ethanol-(1) and its dihydrochloride, M.P. 118–121° C. (decomp.), were prepared from 1-(4'-nitro - 3',5' - dibromo-phenyl)-2-(N-methyl-ethylamino)-ethanol-(1) hydrochloride.

EXAMPLE 127

Using a procedure analogous to that described in Example 115, 1-(4'-amino-3',5'-dibromo-phenyl)-2-diisopropylamino-ethanol-(1) and its hydrobromide, M.P. 176–177° C. (decomp.), were prepared from 1-(4'-nitro-3',5'-dibromo-phenyl) - 2 - diisopropylamino-ethanol-(1) hydrochloride.

EXAMPLE 128

Using a procedure analogous to that described in Example 115, 1-(4'-amino-3',5'-dibromo-phenyl)-2-diallylamino-ethanol-(1) and its hydrochloride, M.P. 173–175° C. (decomp.), were prepared from 1-(4'-nitro-3',5'-dibromophenyl) - 2 - diallylamino - ethanol - (1) hydrochloride.

EXAMPLE 129

Using a procedure analogous to that described in Example 115, 1 - (4'-amino-3',5'-dibromo-phenyl)-2-sec.butylamino-ethanol-(1) and its hydrochloride, M.P. 151–153° C. (decomp.), were prepared from 1-(4'-nitro-3',5'-dibromo-phenyl) - 2 - sec. butylamino-ethanol-(1) hydrochloride.

EXAMPLE 130

Using a procedure analogous to that described in Example 115, 1-(4'-amino-3',5'-dibromo-phenyl)-2-cyclopropylamino-ethanol-(1) and its hydrochloride, M.P. 200–202° C. (decomp.), were prepared from 1-(4'-nitro-3',5' - dibromo - phenyl)-2-cyclopropylamino-ethanol-(1) hydrochloride.

EXAMPLE 131

Using a procedure analogous to that described in Example 115, 1-(4'-amino-3',5'-dibromo-phenyl)-2-cyclohexylamino-ethanol-(1) and its hydrochloride, M.P. 131–132° C. (decomp.), were prepared from 1-(4'-nitro-3',5'-dibromophenyl)-2-cyclohexylamino-ethanol - (1) hydrochloride.

EXAMPLE 132

Using a procedure analogous to that described in Example 115, 1 - (4' - amino - 3',5'-dibromo-phenyl)-2-(N-ethyl-cyclohexylamino)-ethanol-(1) and its hydrochloride, M.P. 196–197° C. (decomp.), were prepared from 1-(4'-nitro - 3',5' - dibromo - phenyl) - 2 - (N - methyl-cyclohexylamino)-ethanol-(1) hydrochloride.

EXAMPLE 133

Using a procedure analogous to that described in Example 115 1 - (4' - amino-3',5'-dibromo-phenyl)-2-adamantylamino-ethanol-(1) and its hydrochloride, M.P. 210-210.5° C. (decomp.), were prepared from 1-(4'-nitro-3',5'-dibromophenyl)-2-adamantylamino-ethanol - (1) hydrochloride.

EXAMPLE 134

Using a procedure analogous to that described in Example 115, 1-(4'-amino-3',5'-dibromo-phenyl)-2-($\beta$-hydroxy-ethyl-amino)-ethanol-(1), an oil chaarcterized by its UV-, IR-, and NMR-spectra as prepared from 1-(4'-nitro - 3',5' - dibromo - phenyl) - 2 - ($\beta$ - hydroxy - ethylamino) -ethanol-(1) hydrochloride.

EXAMPLE 135

Using a procedure analogous to that described in Example 115, 1 - (4'-amino-3',5'-dibromo-phenyl)-2-($\beta$-diethylamino-ethyl-amino)-ethanol-(1), M.P. 120–122° C., as prepared from 1-(4'-nitro-3',5'-dibromo-phenyl)-2-($\beta$-diethyl-amino-ethyl-amino)-ethanol-(1) hydrochloride.

EXAMPLE 136

Using a procedure analogous to that described in Example 115, 1-(4'-amino-3',5'-dibromo-phenyl)-2-($\gamma$-methoxy-n-propylamino)-ethanol-(1) and its hydrochloride, M.P. 115–117° C. (decomp.), were prepared from 1-(4'-nitro-3',5' - dibromo - phenyl) - 2 - ($\gamma$-methyoxy-N-propylamino)-ethanol-(1) hydrochloride.

EXAMPLE 137

Using a procedure analogous to that described in Example 115, 1-(4'-amino-3',5'-dibromo-phenyl)-2-pyrrolidino-ethanol-(1) and its hydrochloride, M.P. 167–168° C. (decomp.), were prepared from 1-(4'-nitro-3',5'-dibromophenyl)-2-pyrrolidino-ethanol-(1) hydrochloride.

EXAMPLE 138

Using a procedure analogous to that described in Example 115, 1-(4'-amino-3',5'-dibromo-phenyl)-2-piperidino-ethanol-(1) and its hydrochloride with 1 mol of methanol of crystallization, M.P. 190–191° C., were prepared from 1-(4'-nitro-3',5'-dibromo-phenyl)-2-piperidino-ethanol-(1) hydrochloride.

EXAMPLE 139

Using a procedure analogous to that described in Example 115, 1 - (4'-amino-3',5'-dibromo-phenyl)-2-hexamethyleneimino-ethanol-(1) and its hydrochloride, M.P. 190–191° C. (decomp.), were prepared from 1-(4'-nitro-3',5' - dibromo - phenyl) - 2 - hexamethyleneimino - ethanol-(1)- hydrochloride.

EXAMPLE 140

Using a procedure analogous to that described in Example 115, 1-(4'-amino-3',5'-dibromo-phenyl)-2-(2″methyl-piperidino)-ethanol-(1) and its hydrochloride, M.P. 196–197° C. (decomp.), were prepared from 1-(4'-nitro- 3',5' - dibromo - phenyl)-2-(2''-methyl-piperidino)-ethanol-(1) hydrochloride.

EXAMPLE 141

Using a procedure analogous to that described in Example 115, 1 - (4' - amino-3',5'-dibromo-phenyl)-2-(N'-methyl-piperazino)-ethanol-(1) and its dihydrochloride with ½ mol of ethanol of crystallization, M.P. 201–202° C. (decomp.), were prepared from 1-(4'-nitro-3',5'-dibromo - phenyl) - 2 - (N' - methyl - piperazino) - ethanol-(1) hydrochloride.

EXAMPLE 142

Using a procedure analogous to that described in Example 115, 1 - (4' - amino-3',5'-dibromo-phenyl)-2-di-n-propylamino-ethane and its hydrochloride, M.P. 184–186° C. (decomp.), were prepared from 1-(4'-nitro-3',5'-dibromo-phenyl)-2-di-n-propylamino-ethane hydrochloride.

EXAMPLE 143

Using a procedure analogous to that described in Example 115, 1 - (4' - amino-3',5'-dibromo-phenyl)-2-morpholino-ethanol-(1) and its dihydrochloride, M.P. 130-130.5° C. (decomp.), were prepared from 1-(4'-nitro-3'5'-dibromo-phenyl)-2-morpholino-ethanol - (1) hydrochloride.

EXAMPLE 144

Using a procedure analogous to that described in Example 115, 1-(4'-amino-3',5'-dibromo-phenyl)-2-camphidino-ethanol-(1) and its hydrobromide, M.P. 207.5–208° C. (decom.), were prepared from 1-(4'-nitro-3',5'-dibromo-phenyl)-2-camphidino-ethanol-(1) hydrochloride.

EXAMPLE 145

Using a procedure analogous to that described in Example 115, 1-(4'-amino-3',5'-dichloro-phenyl)-2-methylamino-ethanol-(1) and its hydrochloride, M.P. 160–163° C. (decomp.), were prepared from 1-(4'-nitro-3',5'-dichloro-phenyl)-2-methylamino-ethanol-(1) hydrochloride.

EXAMPLE 146

Using a procedure analogous to that described in Example 115, 1-(4'-amino-3',5'-dichloro-phenyl)-2-dimethylamino-ethanol-(1) and its hydrochloride, M.P. 196–198° C. (decomp.), were prepared from 1-(4'-nitro-3',5'-dichloro-phenyl)-2-dimethylamino-ethanol-(1) hydrochloride.

EXAMPLE 147

Using a procedure analogous to that described in Example 115, 1-(4'-amino - 3',5' - dichloro-phenyl)-2-ethylamino-ethanol-(1) and its hydrochloride, M.P. 171–173° C. (decomp.), were prepared from 1-(4'-nitro-3',5'-dichloro-phenyl)-2-ethylamino-ethanol-(1) hydrochloride.

EXAMPLE 148

Using a procedure analogous to that described in Example 115, 1-(4'-amino-3',5'-dichloro-phenyl)-2-diethylamino-ethanol-(1) and its hydrochloride, M.P. 152–154° C. (decomp.), were prepared from 1-(4'-nitro-3'5'-dichloro-phenyl)-2-diethylamino-ethanol - (1) hydrochloride.

EXAMPLE 149

Using a procedure analogous to that described in Example 115, 1-(4'-amino-3',5'-dichloro-phenyl)-2-n-propylamino-ethanol-(1) and its hydrochloride, M.P. 120–123° C. (decomp.), were prepared from 1-(4'-nitro-3',5'-dichloro-phenyl)-2-n-propylamino-ethanol-(1) hydrochloride.

EXAMPLE 150

Using a procedure analogous to that described in Example 115, 1-(4'-amino - 3',5' - dichloro-phenyl)-2-di-n-propylamino-ethanol-(1) and its hydrochloride, M.P. 110–120° C. (decomp.), were prepared from 1-(4'-nitro-3',5'-dichloro-phenyl)-2-di-n-propylamino-ethanol-(1) hydrochloride.

EXAMPLE 151

Using a procedure analogous to that described in Example 115, 1-(4'-amino-3',5'-dichloro-phenyl)-2-isopropylamino-ethanol-(1) and its hydrochloride, M.P. 193–193.5° C. (decomp.), were prepared from 1-(4'-amino-3',5' - dichloro-phenyl)-2-isopropylamino-ethanol-(1) hydrochloride.

EXAMPLE 152

Using a procedure analogous to that described in Example 115, 1-(4'-amino-3',5'-dichloro-phenyl)-2-n-butylamino-ethanol-(1) and its hydrochloride, M.P. 181–182° C., were prepared from 1-(4'-nitro-3',5'-dichloro-phenyl)-2-n-butylamino-ethanol-(1) hydrochloride.

EXAMPLE 153

Using a procedure analogous to that described in Example 116, 1-(4'-amino-2',5'-dichloro-phenyl)-2-methyl-amino-ethanol-(1) hydrochloride, M.P. 164.5–166° C., as prepared from 1-(4' - nitro-2',5'-dichloro-phenyl)-2-methylamino-ethanol-(1) hydrochloride.

EXAMPLE 154

Using a procedure analogous to that described in Example 116, 1-(4'-amino-2',5'-dichloro-phenyl)-2-dimethylamino-ethanol-(1) dihydrochloride, M.P. 169–170° C. (decomp.), as prepared from 1-(4'-nitro-2',5'-dichloro-phenyl)-2-dimethylamino-ethanol-(1) hydrochloride.

EXAMPLE 155

Using a procedure analogous to that described in Example 116, 1-(4'-amino - 2',5' - dichloro-phenyl)-2-ethylamino-ethanol-(1) hydrochloride, M.P. 191–192° C. (decomp.), were prepared from 1-(4'-nitro-2',5'-dichloro-phenyl)-2-ethylamino-ethanol-(1) hydrochloride.

EXAMPLE 156

Using a procedure analogous to that described in Example 116, 1-(4'-amino-2',5'-dichloro-phenyl)-2-diethyl-amino-ethanol-(1) hydrochloride, M.P. 182–183° C. (decomp.), as prepared from 1-(4'-nitro-2',5'-dichloro-phenyl)-2-diethylamino-ethanol-(1) hydrochloride.

EXAMPLE 157

Using a procedure analogous to that described in Example 116, 1-(4'-amino-2',5'-dichloro-phenyl)-2-isopropylamino-ethanol-(1) hydrochloride, M.P. 206–206.5° C. (decomp.), as prepared from 1-(4'-nitro-2',5'-dichloro-phenyl-2-isopropylamino-ethanol-(1) hydrochloride.

EXAMPLE 158

Using a procedure analogous to that described in Example 116, 1-(4'-amino - 2',5' - dichloro-phenyl)-2-(N-methyl-cyclohexylamino)-ethanol-(1) hydrochloride, M.P. 199–200° C. (decomp.), as prepared from 1-(4'-nitro-2',5'-dichloro-phenyl) - 2 - (N-methyl-cyclohexylamino)-ethanol-(1) hydrochloride.

EXAMPLE 159

Using a procedure analogous to that described in Example 116, 1-(4'-amino-2',5'-dibromo-phenyl)-2-diethylamino-ethanol-(1) hydrochloride, M.P. 197–197.5° C. (decomp.), as prepared from 1-(4'-nitro-2',5'-dibromo-phenyl)-2-diethylamino-ethanol-(1) hydrochloride.

EXAMPLE 160

Using a procedure analogous to that described in Example 115, 1-(4'-amino-3',5'-dibromo-phenyl)-2-n-propyl-2-pyrrolidino-ethane and its hydrochloride, M.P. 140–142° C. (decomp.), were prepared from 1-(4'-nitro-3',5'-dibromo-phenyl)-2-n-propyl-2-pyrrolidino-ethane hydrochloride.

EXAMPLE 161

Using a procedure analogous to that described in Example 117, 1-(2'-amino-3',5'-dibromo-phenyl)-2-dimethyl-amino-ethanol-(1) hydrochloride, M.P. 189–190° C. (decomp.), as prepared from 1-(2'-acetylamino-3',5'-dibromo-phenyl)-2-dimethylamino-ethanol-(1) hydrochloride.

EXAMPLE 162

Using a procedure analogous to that described in Example 117, 1-(2'-amino-3',5'-dibromo-phenyl)-2-diethyl-amino-ethanol-(1) hydrochloride, M.P. 177–178° C., as prepared from 1-(2'-acetylamino-3',5'-dibromo-phenyl)-2-diethylamino-ethanol-(1) hydrochloride.

EXAMPLE 163

Using a procedure analogous to that described in Example 117, 1-(2'-amino - 3',5' - dibromo-phenyl)-2-di-n-propylamino-ethanol-(1) hydrochloride, M.P. 186–187° C., as prepared from 1-(2'-acetylamino-3',5'-dibromo-phenyl)-2-di-n-propylamino-ethanol-(1) hydrochloride.

EXAMPLE 164

Using a procedure analogous to that described in Example 117, 1,-(4'-amino-3',5'-dibromo-phenyl)-2-diethyl-amino-ethanol-(1) hydrochloride, M.P. 198–199° C. (decomp.), as prepared from 1-(4'-acetylamino-3',5'-dibromo-phenyl)-2-diethylamino-ethanol - (1) hydrochloride.

EXAMPLE 165

Using a procedure analogous to that described in Example 117, 1-(4'-amino-3',5'-dibromo - phenyl) - 2 - diethyl-amino-ethanol-(1) hydrochloride, M.P. 198–199° C. (decomp.), as prepared from 1-(4'-propionylamino-3',5'-dibromo-phenyl)-2-diethylamino-ethanol - (1) hydrochloride.

EXAMPLE 166

Using a procedure analogous to that described in Example 117, 1-(4'-amino - 3',5' - dibromo-phenyl)-2-diethylamino-ethanol-(1) hydrochloride, M.P. 198–199° C. (decomp.), as prepared from 1-(4'-benzoylamino-3',5'-dibromo - phenyl) - 2 - diethylamino-ethanol-(1) hydrochloride.

EXAMPLE 167

Using a procedure analogous to that described in Example 117, 1-(4'-amino - 3',5' - dibromo-phenyl)-2-diethyl-amino-ethanol-(1) hydrochloride, M.P. 198–199° C. (decomp.), as prepared from 1-[4'-(p-chloro-benzoyl-amino)-3',5'-dibromo - phenyl] - 2 - diethylamino-ethanol-(1) hydrochloride.

EXAMPLE 168

Using a procedure analogous to that described in Example 117, 1-(4'-amino - 3',5' - dichloro-phenyl)-2-diethyl - amino - ethanol-(1) hydrochloride, M.P. 152–154° C., as prepared from 1-(4'-acetylamino - 3',5' - dichloro-phenyl)-2-diethylamino-ethanol-(1) hydrochloride.

EXAMPLE 169

Using a procedure analogous to that described in Example 118, 1-(2'-amino - 3',5' - dibromo-phenyl)-2-di-methyl-amino-ethanol - (1) and its hydrochloride, M.P. 189–190° C. (decomp.), were prepared from (2-amino-3,5-dibromo-phenyl)-glyoxalic acid dimethylamide.

EXAMPLE 170

Using a procedure analogous to that described in Example 118, 1-(2'-amino-3,'5'-dibromo - phenyl)-2-di-n-propylamino - ethanol - (1) and its hydrochloride, M.P. 186–187° C., were prepared from (2-amino-3,5-dibromo-phenyl)-glyoxalic acid di-n-propylamide.

EXAMPLE 171

Using a procedure analogous to that described in Example 118, 1-(2'-amino-3',5'-dibromo-phenyl)-2-diallyl-amino-ethanol-(1) and its hydrochloride, M.P. 162–164° C., were prepared from (2-amino-3,5-dibromo-phenyl)-glyoxalic acid diallylamide.

EXAMPLE 172

Using a procedure analogous to that described in Example 118, 1-(2'-amino - 3',5' - dibromo-phenyl)-2-dipropargylamino-ethanol-(1) and its hydrochloride, M.P. 160–162° C., were prepared from (2-amino-3,5-dibromo-phenyl)-glyoxalic acid dipropargylamide.

EXAMPLE 173

Using a procedure analogous to that described in Example 118, 1-(2'-amino-3'-bromo-5'-chloro - phenyl)-2-diethylamino-ethanol-(1) and its hydrochloride, M.P. 165° C., were prepared from (2-amino-3-bromo-5-chloro-phenyl)-glyoxalic acid diethylamide.

EXAMPLE 174

Using a procedure analogous to that described in Example 119, 1-(2'-amino-3',5'-dibromo-phenyl) - 2 - dimethylamino-ethanol-(1) and its hydrochloride, M.P. 189–190° C. (decomp.), were prepared from (2-amino-3,5-dibromo-phenyl)-glycolic acid dimethylamide.

EXAMPLE 175

Using a procedure analogous to that described in Example 119, 1-(2'-amino-3',5'-dibromo - phenyl)-2-di-n-propylamino-ethanol-(1) and its hydrochloride, M.P. 186–187° C., were prepared from (2-amino-3,5-dibromo-phenyl)-glycolic acid di-n-propylamide.

EXAMPLE 176

Using a procedure analogous to that described in Example 119, 1-(2'-amino-3',5'-dibromo - phenyl)-2-diallyl-amino-ethanol-(1) and its hydrochloride, M.P. 162–164° C., were prepared from (2-amino-3,5-dibromo-phenyl)-glycolic acid diallylamide.

EXAMPLE 177

Using a procedure analogous to that described in Example 119, 1-(2'-amino-3',5'-dibromo-phenyl)-2-dipropargyl-amino-ethanol - (1) and its hydrochloride, M.P. 160–162° C., were prepared from (2-amino-3,5-dibromo-phenyl)-glycolic acid dipropargylamide.

EXAMPLE 178

Using a procedure analogous to that described in Example 119, 1-(2'-amino - 3' - bromo-5'-chloro-phenyl)-2-diethylamino-ethanol-(1) and its hydrochloride, M.P. 165° C., were prepared from (2-amino-3-bromo-5-chloro-phenyl)-glycolic acid diethylamide.

EXAMPLE 179

Using a procedure analogous to that described in Example 115, 1-(4'-amino-3',5'-dibromo-phenyl)-2-diethyl-amino-ethane and its hydrochloride, M.P. 205–207° C., were prepared from 1-(4'-nitro-3',5'-dibromo-phenyl)-2-diethylamino-ethane hydrochloride.

The hydrochloride was also otbained by the procedure described in Example 117, i.e., by boiling 1-(4'-acetyl-amino-3',5'-dibromo-phenyl)-2-diethylamino-ethane or its hydrochloride with isopropanolic hydrochloric acid.

EXAMPLE 180

Using a procedure analogous to that described in Example 117, 1 - (2' - amino-3',5'-dibromo-phenyl)-2-(N-methyl - anilino) - ethanol-(1)hydrochloride, M.P. 146–147° C., as prepared from 1(2'-acetylamino-3',5'-dibromophenyl) - 2 - (N-methyl-anilino)-ethanol-(1) hydrochloride.

EXAMPLE 181

Using a procedure analogous to that described in Example 117, 1 - (2' - amino - 3',5'-dibromo-phenyl)-2-(N-ethylbenzylamino)-ethanol-(1), an oil, thin-layer chromatographically uniform $R_f$=0.4 (silica gel, chloroform: methanol=9:1), was prepared from 1-(2'-acetylamino-3',5' - dibromophenyl) - 2 - (N-ethyl-benzylamino)-ethanol-(1).

EXAMPLE 182

Using a procedure analogous to that described in Example 117, 1-(4' - amino - 3',5'-dibromo-phenyl)-2-allyl-amino-ethanol-(1) hydrochloride, M.P. 173–173.5° C. (decomp.), as prepared from 1-(4'-acetylamino-3',5'-dibromo-phenyl) - 2 - allylamino-ethanol-(1) hydrochloride.

EXAMPLE 183

Using a procedure analogous to that described in Example 115, 1-(4'-amino-3',5'-dibromo-phenyl)-2-benzyl-amino-ethanol(1) and its hydrochloride, M.P. 159–160° C. (decomp.), were prepared from 1-(4'-nitro-3',5'-dibromophenyl) - 2 - benzylamino-ethanol-(1) hydrochloride.

EXAMPLE 184

Using a procedure analogous to that described in Example 115, 1 - (4' - amino - 3',5' - dichloro-phenyl)-2-amino-ethanol-(1) and its hydrochloride, M.P. 199–204° C. (decomp.), were prepared from 1-(4'-nitro-3',5'-dichlorophenyl) - 2 - amino-ethanol-(1) hydrochloride.

EXAMPLE 185

Using a procedure analogous to that described in Example 117, 1-(3'-amino-4',6' - dibromo-phenyl) - 2 - dimethylamino-ethanol(1) hydrochloride, M.P. 208–212° C. (decomp.), as prepared from 1(3'-acetylamino-4',6'-dibromo-phenyl) - 2 - dimethylamino-ethanol-(1) hydrochloride.

EXAMPLE 186

Using a procedure analogous to that described in Example 117, 1 - (3' - amino - 4',6' - dibromo-phenyl)-2-benzyl-amino-propanol - (1) hydrochloride, M.P. 222° C. (decomp.), as prepared from 1-(3'-acetylamino-4',6'-dibromo-phenyl) - 2 - benzylaminopropanol-(1) hydrochloride.

EXAMPLE 187

Using a procedure analogous to that described in Example 117, 1 - (3' - amino - 4',6'-dibromo-phenyl)-2-di ethylaminopropanol-(1) hydrochloride, M.P. 220–221° C., as prepared from 1-(3'-acetylamino-4',6'-dibromo-phenyl)-2-diethylaminopropanol(1) hydrochloride.

EXAMPLE 188

Using a procedure analogous to that described in Example 117, 1 - (2' - amino - 3',5' - dibromo-phenyl)-2-aminoethanol-(1)dihydrochloride, M.P. 180–190° C. (decomp.), as prepared from 1-(2-acetyl- amino 3',5'-dibromo-phenyl) - 2 - amino-ethanol-(1) hydrochloride.

EXAMPLE 189

Using a procedure analogous to that described in Example 117, 1 - (2' - amino-3',5'-dibromo-phenyl)-2-methylamino-ethanol-(1) hydrochloride, M.P. 120–121° C., as prepared from 1 - (2' - acetylamino - 3',5' - dibromo-phenyl) - 2 - methylamino-ethanol-(1) hydrochloride.

EXAMPLE 190

Using a procedure analogous to that described in Example 117, 1 - (2' - amino - 3',5' - dibromo-phenyl)-2-n-propylamino-ethanol-(1), M.P. 118–120° C., as prepared from - 1 - (2' - acetylamino - 3',5' - dibromo-phenyl-2-n-propylamino-ethanol-(1) hydrochloride.

EXAMPLE 191

Using a procedure analogous to that described in Example 117, 1 - (2' - amino - 3',5' - dibromo-phenyl)-2-isopropylamino-ethanol-(1) hydrochloride, M.P. 170–172° C., as prepared from 1-(2'-acetylamino-3',5'-dibromo-phenyl) - 2 - isopropylamino-ethanol-(1) hydrochloride.

EXAMPLE 192

Using a procedure analogous to that described in Example 117, 1 - (2' - amino - 3',5'-dibromo-phenyl)-2-n-butylamino-ethanol-(1), M.P. 87–89° C., as prepared from 1 - (2' - acetylamino - 3',5' - dibromo-phenyl)-2-n-butylamino-ethanol-(1) hydrochloride.

EXAMPLE 193

Using a procedure analogous to that described in Example 117, 1 - (2' - amino - 3',5' - dibromo-phenyl)-2-(tert. butylamino) - ethanol - (1) hydrochloride, M.P. 211–213° C., as prepared from 1-(2'-acetylamino-3',5'-dibromo-phenyl) - 2-(tert. butylamino)-ethanol-(1) hydrochloride.

EXAMPLE 194

Using a procedure analogous to that described in Example 117, 1-(2'-amino - 3',5' - dibromo-phenyl)-2-diisopropylamino-ethanol-(1) hydrochloride, M.P. 162–166° C., as prepared from 1-(2'-acetylamino-3',5'-dibromo-phenyl)-2-diisopuropylamino-ethanol-(1) hydrochloride.

EXAMPLE 195

Using a procedure analogous to that described in Example 117, 1-(2'-amino-3',5'-dibromo-phenyl)-2-methyl-amino-propanol-(1) hydrochloride, M.P. 209–210° C., as prepared from 1-(2'-acetylamino-3',5'-dibromo-phenyl)-2-methylamino-propanol-(1) hydrochloride.

EXAMPLE 196

Using a procedure analogous to that described in Example 117, 1-(2'-amino - 3',5' - dibromo-phenyl)-2-ethyl-amino-propanol-(1) hydrochloride, M.P. 246–248° C. (decomp.), as prepared from 1-(2'-acetylamino-3',5'-dibromo-phenyl)-2-ethylamino-propanol-(1) hydrochloride.

EXAMPLE 197

Using a procedure analogous to that described in Example 117, 1-(2'-amino - 3',5' - dibromo-phenyl)-2-n-propylamino-propanol-(1) hydrochloride, M.P. 236–238° C. (decomp.), as prepared from 1-(2'-acetylamino-3',5'-dibromo-phenyl)-2-n-propylamino-propanol-(1) hydrochloride.

EXAMPLE 198

Using a procedure analogous to that described in Example 117, 1-(2'-amino-3',5'-dibromo-phenyl)-2-isopropylamino-propanol-(1) hydrochloride, M.P. 212–215° C. (decomp.), as prepared from 1-(2'-acetylamino-3',5'-dibromo-phenyl) - 2 - isopropylamino-propanol-(1) hydrochloride.

EXAMPLE 199

Using a procedure analogous to that described in Example 117, 1 - (2' - amino-3',5'-dibromo-phenyl)-2-(tert. butyl-amino)-propanol-(1) hydrochloride, M.P. 245° C. (decomp.), as prepared from 1-(2'-acetylamino-3',5'-dibromo-phenyl)-2-(tert. butyl-amino)-propanol-(1) hydrochloride.

EXAMPLE 200

Using a procedure analogous to that described in Example 117, 1-(2'-amino-3',5'-dibromo-phenyl)-2-dimethylamino-propanol-(1) hydrochloride, M.P. 221–222° C. (decomp.), as prepared from 1-(2'-acetylamino-3',5'-dibromo-phenyl) - 2 - dimethylamino - propanol-(1) hydrochloride.

EXAMPLE 201

Using a procedure analogous to that described in Example 117, 1-(2'-amino-3',5'-dibromo-phenyl)-2-dimethylamino-ethane hydrochloride, M.P. 220–222° C. (decomp.), as prepared from 1-(2'-acetylamino-3',5'-dibromo-phenyl)-2-dimethylamino-ethane hydrochloride.

The compounds according to the present invention, that is, the free bases embraced by Formula I above and their non-toxic, pharmacologically acceptable acid addition salts, have useful pharmacodynamic properties. More particularly, they exhibit bronchodilating analgesic sedative, antipyretic, antiphlogistic and antitussive activities as well as enhance blood circulation in warm-blooded animals, such as mice.

A representative number of compounds according to the present invention were pharmaologically tested for analgesic activity and acute toxicity on male laboratory mice of the NMRI-strain having an average body weight of 20 gm. The following compounds were tested:

(A) 1-(4'-amino-3',5'-dibromo-phenyl)-2-diethyl-amino-ethanol-(1) hydrochloride;

(B) 1-(4'-amino-3',5'-dibromo-phenyl)-2-dimethylamino-ethanol-(1) hydrochloride;

(C) 1-(4'-amino-3',5'-dibromo-phenyl)-2-ethyl-amino-ethanol-(1) hydrochloride;

(D) 1-(4'-amino-3',5'-dibromo-phenyl)-2-ethyl-amino-propanol-(1) dihydrochloride;

(E) 1-(4'-amino-3',5'-dibromo-phenyl)-2-amino-ethanol-(1) hydrochloride;

(F) 1-(4'-amino-3',5'-dichloro-phenyl)-2-ethyl-amino-ethanol-(1) hydrochloride; and (G) Codeine phosphate.

Analgesic activity

The standard pharmacological tail-pinch test method of Haffner, Deutsche Medizinische Wochenschrift 1929, 731, was used. When opened to a width corresponding to the diameter of a mouse tail at the root, the Dieffenbach clamp which was used exerted a pressure of 350–400 gm. Varying doses of each compound in aqueous solution were administered perorally to the test animals with the aid of an esophageal sound, using at least 10 different animals per dose per compound. After administration of each dose, it was determined at intervals of 30 minutes how many animals no longer reacted to the application of the clamp at the base of the tail. From the results thus obtained, the dose was graphically determined which produced a distinct suppression of the defensive reaction in 50% of the animals ($ED_{50}$). As a rule, the maximum analgesic effect was observed 30 minutes after administration of each dose. The following table shows the results of this test.

TABLE I

| Compound | Number of doses | Animals per dose | $ED_{50}$ mg./kg. | Relative effective strength |
|---|---|---|---|---|
| Codeine phosphate | 4 | 40 | 90.0 | 1.0 |
| A | 4 | 10 | 4.6 | 19.6 |
| B | 4 | 10 | 9.0 | 10.0 |
| C | 4 | 10 | 6.5 | 13.8 |
| D | 3 | 20 | 9.4 | 9.6 |
| E | 4 | 20 | 40.0 | 2.3 |
| F | 4 | 20 | 3.2 | 28.1 |

These results show that the compounds according to the instant invention are very effective analgesics.

Acute toxicity

Various doses of each of the compounds in admixture with methylcellulose were administered perorally to the test animals, and the number of animals which perished within 24 hours was observed and the median lethal dose ($LD_{50}$) was calculated according to the method of Litchfield and Wilcoxon [J. Pharmacol. exper. Therap. 96, 99 (1949)]. The results of this test are shown in the following table:

TABLE II

| Compound | Number of doses | Number of animals per dose | $LD_{50}$, mg./kg. |
|---|---|---|---|
| Codeine phosphate | 4 | 10 | 376.0 |
| A | 4 | 10 | 285.0 |
| B | 3 | 10 | 417.0 |
| C | 3 | 10 | 315.0 |
| D | 3 | 10 | 265.0 |
| E | 3 | 10 | *>1,000.0 |
| F | 3 | 10 | 245.0 |

* Only 3 out of 10 animals died after this dose.

For pharmaceutical purposes, the compounds according to the present invention are administered perorally or parenterally to warm-blooded animals as active ingredients in customary dosage unit compositions, that is, compositions in dosage unit form consisting essentially of an inert pharmaceutical carrier and one dosage unit of the active ingredient, such as tablets, coated pills, capsules, wafers, solutions, suspensions, emulsions, syrups, suppositories, and the like. One dosage unit of the compounds of the instant invention is from 0.165 to 0.85 mgm./kg. body weight, preferably from 0.33 to 0.50 mgm./kg. body weight.

The following examples illustrate a few dosage unit compositions comprising a compound of the present invention as an active ingredient, and represent the best mode contemplated by putting the invention to practical use. The parts are parts by weight unless otherwise specified.

EXAMPLE 202

Tablets

The tablet composition was compounded from the following ingredients:

| | Parts |
|---|---|
| 1-(4'-amino-3',5'-dibromo-phenyl)-2-diethyl-amino-ethanol-(1), HCl | 20.0 |
| Colloidal silicic acid | 10.0 |
| Lactose | 118.0 |
| Potato starch | 60.0 |
| Polyvinylpyrrolidone | 6.0 |
| Sodium cellulose glycolate | 4.0 |
| Magnesium stearate | 2.0 |
| Total | 220.0 |

Compounding procedure:

The ethanol compound, the silica acid, the lactose, the potato starch and the polyvinylpyrrolidone were intimately admixed with each other, the mixture was moistened with water, and the moist mass was forced through a 1.5 mm.-mesh screen. The moist granulate thus obtained was dried at 45° C., again passed through the screen, admixed with the cellulose glycolate and the magnesium stearate, and the mixture was pressed into 220 mgm.-tablets with the aid of a conventional tablet-making machine. One tablet contained 20.0 mgm. of the ethanol compound and, when administered perorally to warm-blooded animal of about 60 kg. body weight in need of such treatment, produced very good analgesic effects.

EXAMPLE 203

Hypodermic solution:

The solution was compounded from the following ingredients:

| | Parts |
|---|---|
| 1-(4'-amino-3',5'-dibromo-phenyl)-2-dimethyl-amino-ethanol-(1), HCl | 30.0 |
| Sorbitol | 40.0 |
| Distilled water, q.s. ad., by vol | 2000.0 |

Compounding procedure:

The ethanol compound and the sorbitol were dissolved in a sufficient amount of distilled water, the solution was diluted to the indicated volume with additional distilled water and was then filtered until free from suspended particles. The filtrate was filled into 2 cc.-ampules, which were then sterilized for 20 minutes at 120° C. One ampule contained 30 mgm. of the ethanol compound, and when the contents of one ampule were administered parenterally to a warm-blooded animal of about 60 kg. body weight in need of such treatment, very good analgesic effects were obtained.

EXAMPLE 204

Suppositories

The suppository composition was compounded from the following ingredients:

|  | Parts |
|---|---|
| 1-(4'-amino-3',5'-dibromo-phenyl) - 2 - diethyl-amino-ethanol-(1), HCl | 20.0 |
| Cocoa butter | 1680.0 |
| Total | 1700.0 |

Compounding procedure:

The cocoa butter was melted and then cooled to 40° C. The finely pulverized ethanol compound was stirred into the cocoa butter with an immersion homogenizer, the mixture was cooled to 35° C. and was then poured into cooled suppository molds, each holding 1700 mgm. of the mixture. One suppository contained 20 mgm. of the ethanol compound and, when administered by the rectal route to a warm-blooded animal of about 60 kg. body weight in need of such treatment, produced very good analgesic effects.

EXAMPLE 205

Drop solution

The solution was compounded from the following ingredients:

|  | Parts |
|---|---|
| 1-(4'-amino-3',5'-dibromo-phenyl) - 2 - dimethyl-amino-ethanol-(1), HCl | 3.0 |
| 1,2-propylene-glycol | 15.0 |
| Saccharin sodium | 0.01 |
| p-Hydroxy-benzoic acid methyl ester | 0.035 |
| p-Hydroxy-benzoic acid propyl ester | 0.015 |
| Distilled water, q.s.ad. by vol. | 100.0 |

Compound procedure:

The p-hydroxy-benzoic acid esters were dissolved in about 90% of the required amount of distilled water at 80° C., the solution was allowed to cool to room temperature, the ethanol compound and the saccharin sodium were dissolved therein, and the propylene-glycol was added thereto. The solution was then diluted to the indicated volume with additional distilled water and filtered until free from fibrous matter. 1 cc. of the solution contained 30 mgm. of the ethanol-(1) compound and, when administered perorally to a warm-blooded animal of about 60 kg. body weight in need of such treatment, produced very good analgesic effects.

Although the above dosage unit composition examples illustrate only two of the compounds according to the present invention as active ingredients, it should be understood that any other compound embraced by Formula I above or a non-toxic acid addition salt thereof may be substituted for the particular ethanol compound in Examples 202 through 205. Moreover, the amount of active ingredient in these examples may be varied to achieve the unit dosage range set forth above, and the amounts and nature of the inert pharmaceutical carrier ingredients may be varied to meet particular requirements.

While the present invention has been illustrated with the aid of certain specific embodiments thereof, it will be readily apparent to others skilled in the art that our invention is not limited to these particular embodiments, and that various changes and modifications may be made without departing from the spirit of the invention or the scope of the appended claims.

We claim:
1. A compound of the formula

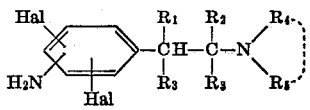

wherein each Hal is chlorine or bromine,
$R_1$ is hydrogen or hydroxyl,
$R_2$ and $R_3$ are each hydrogen or alkyl of 1 to 4 carbon atoms, and
$R_4$ and $R_5$ are each hydrogen, lower alkyl, allyl, propargyl, β-hydroxy-ethyl, 3-methoxy-propyl, dimethylaminoethyl, cyclohexyl, phenyl, benzyl ro adamantyl or a non-toxic, pharmacologically acceptable acid addition salt thereof.

2. A compound of the formula

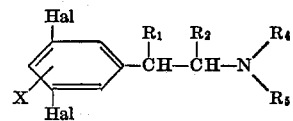

wherein each Hal is chlorine or bromine,
$R_1$ is hydrogen or hydroxyl,
$R_2$ is hydrogen or methyl,
$R_4$ and $R_5$ are each hydrogen or alkyl of 1 to 4 carbon atoms, and
X is 2- or 4-amino, or a non-toxic, pharmacologically acceptable acid addition salt thereof.

3. A compound as in claim 2, which is 1-(4'-amino-3',5'-dibromo-phenyl)-2-(diethylamino)-ethanol-(1) or a non-toxic, pharmacologically acceptable acid addition salt thereof.

4. A compound according to claim 2, which is 1-(2'-amino-3',5'-dibromo-phenyl)-2 - (diethylamino)-ethanol-(1) or a non-toxic, pharmacologically acceptable acid addition salt thereof.

5. A compound according to claim 2, which is 1-(4'-amino-3',5'-dibromo-phenyl)-2 - dimethylamino)-ethanol-(1) or a non-toxic, pharmacologically acceptable acid addition salt thereof.

6. A compound according to claim 2, which is 1-(4'-amino-3',5'-dibromo-phenyl) - 2 - amino-ethanol-(1) or a non-toxic, pharmacologically acceptable acid addition salt thereof.

7. A compound according to claim 2, which is 1-(4'-amino-3',5'-dibromo-phenyl) - 2 - (dimethylamino)-propanol-(1) or a non-toxic, pharmacologically acceptable acid addition salt thereof.

8. A compound according to claim 2, which is 1-(4'-amino-3',5'-dibromo-phenyl) - 2 - (ethylamino)-ethanol-(1) or a non-toxic, pharmacologically acceptable acid addition salt thereof.

9. A compound according to claim 2, which is 1-(4'-amino-3',5'-dibromo-phenyl) - 2 - amino-propanol-(1) or a non-toxic, pharmacologically acceptable acid addition salt thereof.

10. A compound according to claim 2, which is 1-(4'-amino-3',5'-dibromo-phenyl-2 - (dimethylamino)-ethane or a non-toxic, pharmacologically acceptable acid addition salt thereof.

11. A compound according to claim 2, which is 1-(4'-3',5'-dibromo-phenyl) - 2 - (methylamino)-ethanol-(1) or a non-toxic pharmacologically acceptable acid addition salt thereof.

12. A compound according to claim 2, which is 1-(4'-amino-3',5'-dichloro-phenyl) - 2 - (tert. butyl-amino)-ethanol-(1) or a non-toxic, pharmacologically acceptable acid addition salt thereof.

13. A compound according to claim 2, which is 1-(4'-amino-3',5'-dibromo-phenyl) - 2-(N-methyl-ethylamino)-ethanol-(1) or a non-toxic, pharmacologically acceptable acid addition salt thereof.

14. A compound according to claim 2, which is 1-(4'-amino-3',5'-dichloro-phenyl) - 2 - (ethylamino)-ethanol-(1) or a non-toxic, pharmacologically acceptable acid addition salt thereof.

References Cited

UNITED STATES PATENTS 3,253,034   5/1966   McLoughlin   260—570.6
3,429,922   2%1969   Berezi et al.   260—570.8

ROBERT V. HINES, Primary Examiner

U.S. Cl. X.R.

260—239, 247, 247.2, 247.5, 268, 293, 294, 294.7, 326.3, 326.5, 326.85, 501.1, 501.17, 501.18, 558, 559, 562, 570.5, 570.6, 570.8, 575, 578; 424—248, 250, 267, 274, 330

**PO-1050
(5/69)**

UNITED STATES PATENT OFFICE
CERTIFICATE OF CORRECTION

Patent No. 3,536,712    Dated October 27, 1970

Inventor(s) Johannes Keck, Gerd Krüger and Hans Machleidt
~~Klaus Noll, Günther Engelhardt and Albrecht Eckenfels~~

It is certified that error appears in the above-identified patent and that said Letters Patent are hereby corrected as shown below:

Col. 5, line 50: the formula should read

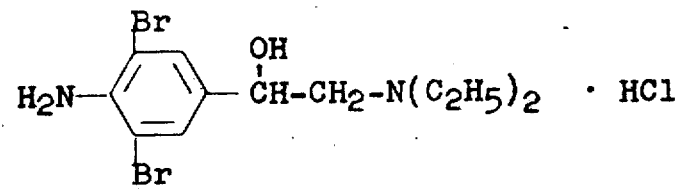

Col. 7, line 57: the formula should read

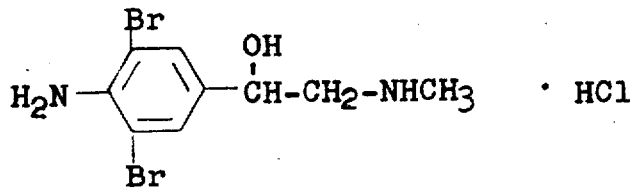

Col. 8, line 46: correct the spelling of "dibromo".

Col. 12, line 17: "2-pipedi-" should read --2-piperi--.

Col. 13, line 15: "thanol" should read --ethanol--.

Col. 14, line 69: insert ")" after "phenyl".

Col. 22, line 7: "(2',4'-dichloro" should read --(2',5'-dichloro--.

Col. 24, line 44: "methyoxy" should read --methoxy--.

Col. 34, line 14: the formula should read

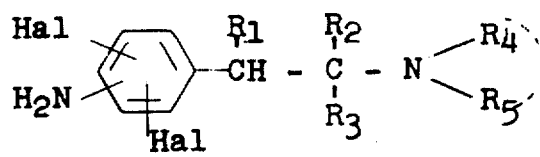

Signed and sealed this 6th day of April 1971.

(SEAL)
Attest:

EDWARD M. FLETCHER, JR.
Attesting Officer

WILLIAM E. SCHUYLER, JR.
Commissioner of Patents